(12) United States Patent
Kompella

(10) Patent No.: US 7,839,850 B2
(45) Date of Patent: Nov. 23, 2010

(54) FORMING EQUAL COST MULTIPATH MULTICAST DISTRIBUTION STRUCTURES

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 758 days.

(21) Appl. No.: 11/445,370

(22) Filed: Jun. 1, 2006

(65) Prior Publication Data

US 2007/0177594 A1 Aug. 2, 2007

Related U.S. Application Data

(60) Provisional application No. 60/763,302, filed on Jan. 30, 2006.

(51) Int. Cl.
*H04L 12/28* (2006.01)
(52) U.S. Cl. .................................... 370/390; 370/238
(58) Field of Classification Search ............... 370/238, 370/248, 392, 432, 396, 216, 229, 390
See application file for complete search history.

(56) References Cited

U.S. PATENT DOCUMENTS

| | | | |
|---|---|---|---|
| 5,600,642 A | 2/1997 | Pauwels et al. | |
| 6,374,303 B1 | 4/2002 | Armitage et al. | |
| 6,477,166 B1 | 11/2002 | Sanzi et al. | |
| 6,493,349 B1 | 12/2002 | Casey | |
| 6,501,754 B1 | 12/2002 | Ohba et al. | |
| 6,553,028 B1 | 4/2003 | Tang et al. | |
| 6,731,652 B2 | 5/2004 | Ramfelt et al. | |
| 6,751,218 B1 | 6/2004 | Hagirahim et al. | |
| 6,778,531 B1 | 8/2004 | Kodialam et al. | |
| 6,807,182 B1 | 10/2004 | Dolphin et al. | |
| 6,879,594 B1 | 4/2005 | Lee et al. | |

(Continued)

FOREIGN PATENT DOCUMENTS

JP 2005-086222 3/2005

(Continued)

OTHER PUBLICATIONS

Eric C. Rosen et al., "Multicast in MPLS/BGP IP VPNs," draft-rosen-vpn-mcast-07.txt, May 2004, 27 pgs.

(Continued)

*Primary Examiner*—Man Phan
*Assistant Examiner*—Wei Zhao
(74) *Attorney, Agent, or Firm*—Shumaker & Sieffert, P.A.

(57) ABSTRACT

Techniques allow network devices to set up multiple multicast distribution structures for a given multicast group and source. According to the techniques, a multicast protocol is extended to include an instance number in the control messages, where the instance number corresponds to one of a plurality of instances for the multicast group and source. The network device sends a join request for each of the N instances for the multicast group to a plurality of upstream routers. Each of the join requests specifies a different instance of the multicast group to be joined. The source device for the multicast group selects one of the N instances, for example using a unicast Equal Cost Multipath (ECMP) hashing algorithm, and sends multicast content for the multicast group to via the multicast distribution structure corresponding to the selected one of the N instances.

33 Claims, 14 Drawing Sheets

U.S. PATENT DOCUMENTS

| | | | |
|---|---|---|---|
| 6,920,503 | B1 | 7/2005 | Nanji et al. |
| 7,035,226 | B2 | 4/2006 | Enoki et al. |
| 7,039,687 | B1 | 5/2006 | Jamieson et al. |
| 7,082,102 | B1 | 7/2006 | Wright |
| 7,133,928 | B2 | 11/2006 | McCanne |
| 7,251,218 | B2 | 7/2007 | Jorgensen |
| 7,269,135 | B2 | 9/2007 | Frick et al. |
| 7,281,058 | B1 | 10/2007 | Shepherd et al. |
| 7,330,468 | B1 | 2/2008 | Tse-Au |
| 7,333,491 | B2 | 2/2008 | Chen et al. |
| 7,359,328 | B1 | 4/2008 | Allan |
| 7,360,084 | B1 | 4/2008 | Hardjono |
| 7,366,894 | B1 | 4/2008 | Kalimuthu et al. |
| 7,418,003 | B1 | 8/2008 | Alvarez et al. |
| 7,463,591 | B1 | 12/2008 | Kompella et al. |
| 7,477,642 | B2 | 1/2009 | Aggarwal et al. |
| 7,483,439 | B2 | 1/2009 | Shepherd et al. |
| 7,545,735 | B1 | 6/2009 | Shabtay et al. |
| 2002/0071390 | A1 | 6/2002 | Reeves et al. |
| 2002/0118644 | A1 | 8/2002 | Moir |
| 2002/0181477 | A1 | 12/2002 | Mo et al. |
| 2002/0186664 | A1 | 12/2002 | Gibson et al. |
| 2002/0191584 | A1 | 12/2002 | Korus et al. |
| 2003/0012215 | A1 | 1/2003 | Novaes |
| 2003/0021282 | A1 | 1/2003 | Hospodor |
| 2003/0031175 | A1 | 2/2003 | Hayashi et al. |
| 2003/0043772 | A1 | 3/2003 | Mathis et al. |
| 2003/0056007 | A1 | 3/2003 | Katsube et al. |
| 2003/0063591 | A1 | 4/2003 | Leung et al. |
| 2003/0087653 | A1 | 5/2003 | Leung et al. |
| 2003/0088696 | A1 | 5/2003 | McCanne |
| 2003/0099235 | A1 | 5/2003 | Shin et al. |
| 2003/0112748 | A1 | 6/2003 | Puppa et al. |
| 2003/0123446 | A1 | 7/2003 | Muirhead et al. |
| 2003/0172114 | A1 | 9/2003 | Leung |
| 2003/0177221 | A1 | 9/2003 | Ould-Brahim et al. |
| 2003/0191937 | A1 | 10/2003 | Balissat et al. |
| 2003/0210705 | A1 | 11/2003 | Seddigh et al. |
| 2004/0037279 | A1 | 2/2004 | Zelig et al. |
| 2004/0042406 | A1 | 3/2004 | Wu et al. |
| 2004/0047342 | A1 | 3/2004 | Gavish et al. |
| 2004/0081154 | A1 | 4/2004 | Kouvelas |
| 2004/0151180 | A1 | 8/2004 | Hu et al. |
| 2004/0151181 | A1 | 8/2004 | Chu et al. |
| 2004/0190517 | A1 | 9/2004 | Gupta et al. |
| 2004/0218536 | A1 | 11/2004 | Yasukawa et al. |
| 2004/0240445 | A1 | 12/2004 | Shin et al. |
| 2004/0240446 | A1* | 12/2004 | Compton ................... 370/389 |
| 2005/0001720 | A1* | 1/2005 | Mason et al. .......... 340/539.13 |
| 2005/0018693 | A1* | 1/2005 | Dull ........................... 370/396 |
| 2005/0025156 | A1* | 2/2005 | Smathers ................. 370/395.5 |
| 2005/0027782 | A1 | 2/2005 | Jalan et al. |
| 2005/0097203 | A1 | 5/2005 | Unbehagen et al. |
| 2005/0108419 | A1 | 5/2005 | Eubanks |
| 2005/0111351 | A1 | 5/2005 | Shen |
| 2005/0169270 | A1 | 8/2005 | Mutou et al. |
| 2005/0220132 | A1 | 10/2005 | Oman et al. |
| 2005/0232193 | A1 | 10/2005 | Jorgensen |
| 2005/0262232 | A1 | 11/2005 | Cuervo et al. |
| 2005/0265308 | A1 | 12/2005 | Barbir et al. |
| 2005/0271035 | A1 | 12/2005 | Cohen et al. |
| 2005/0271036 | A1 | 12/2005 | Cohen et al. |
| 2005/0281192 | A1 | 12/2005 | Nadeau et al. |
| 2006/0013141 | A1 | 1/2006 | Mutoh et al. |
| 2006/0039364 | A1 | 2/2006 | Wright |
| 2006/0047851 | A1 | 3/2006 | Voit et al. |
| 2006/0126496 | A1 | 6/2006 | Filsfils et al. |
| 2006/0147204 | A1 | 7/2006 | Yasukawa et al. |
| 2006/0153067 | A1 | 7/2006 | Vasseur et al. |
| 2006/0164975 | A1 | 7/2006 | Filsfils et al. |
| 2006/0182034 | A1* | 8/2006 | Klinker et al. ............... 370/238 |
| 2006/0221958 | A1 | 10/2006 | Wijnands et al. |
| 2007/0025277 | A1 | 2/2007 | Sajassi et al. |
| 2007/0036162 | A1 | 2/2007 | Tingle et al. |
| 2007/0098003 | A1* | 5/2007 | Boers et al. ................. 370/432 |
| 2007/0124454 | A1 | 5/2007 | Watkinson |
| 2007/0140107 | A1* | 6/2007 | Eckert et al. ................ 370/216 |
| 2008/0056258 | A1 | 3/2008 | Sharma et al. |
| 2008/0123524 | A1 | 5/2008 | Vasseur et al. |
| 2008/0123654 | A1 | 5/2008 | Tse-Au |
| 2008/0291921 | A1 | 11/2008 | Du et al. |
| 2009/0028149 | A1 | 1/2009 | Yasukawa et al. |

FOREIGN PATENT DOCUMENTS

| | | |
|---|---|---|
| JP | 2005130258 A | 5/2005 |
| JP | 2005167482 A | 6/2005 |
| JP | 2005252385 A | 9/2005 |
| JP | 2005-323266 | 11/2005 |
| KR | 2004001206 | 1/2004 |
| WO | WO 02/091670 A2 | 11/2002 |
| WO | WO 2004/071032 A1 | 8/2004 |

OTHER PUBLICATIONS

Steven Deering et al., "Protocol Independent Multicast-Sparse Mode (PIM-SM): Motivation and Architecture," draft-ietf-idmr-pim-arch-05.txt, Aug. 4, 1998, 30 pgs.

K. Kompella et al., "Virtual Private LAN Service," draft-ietf-l2vpn-vpls-bgp-00.txt, May 2003, 22 pgs.

Y. Rekhter et al., "A Border Gateway Protocol 4 (BGP-4)," Mar. 1995, 72 pgs.

Aggarwal et al., "Establishing Point to Multipoint MPLS TE LSPs," submitted to Internet Engineering Task Force (IETF) Feb. 11, 2007, pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

Examination Report for, corresponding European Application No. 06 118 021.2, dated Nov. 12, 2007, 4 pgs.

European Search Report dated Sep. 25, 2006, for corresponding European Application No. 06118021.2, 7 pages.

B. Zhang, "A Destination-initiated Multicast Routing Protocol for Shortest Path Tree Constructions," Globecom 2003, pp. 2840-2844.

Notification of First Office Action dated Aug. 1, 2008 for corresponding Chinese Application No. 200610143131.0, 9 pgs.

L. Martini et al., "Transport of Layer 2 Frames Over MPLS," Network Working Group Internet Draft, draft-martini-l2circuit-trans-mpls-08.txt, Nov. 2001, 18 pgs.

L. Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

Notice of Reasons for Rejection (translation) dated Feb. 3, 2009, for corresponding Japanese Patent Application No. 2006-232035 (3 pgs.).

Fujita, N., "Dynamic Selective Replication Schemes for Content Delivery Networks." IPSJ SIG Notes, vol. 2001, No. 111, Information Processing Society of Japan, Nov. 21, 2001, 2 pgs.

Aggarwal et al., "MPLS Upstream Label Assignment for RSVP-TE and LDP," Aug. 24, 2005, http://www.tla-group.com/~mpls/ietf-63-mpls-upstream-rsvp-ldp.ppt, 8 pgs.

Satyanarayana et al., "Extensions to GMPLS RSVP Graceful Restart", draft-aruns-ccamp-restart-ext-01.txt, Jul. 2004, Network Working Group Internet Draft, 12 pgs.

Office Action dated Jun. 29, 2009 for U.S. Appl. No, 11/445,353.

Responsive Amendment to Office Action dated Jun. 29, 2009 for U.S. Appl. No. 11/445,353, filed Sep. 29, 2009.

Office Action dated Dec. 19, 2008 for U.S. Appl. No. 11/445,353.

Responsive Amendment to Office Action dated Dec. 19, 2008 for U.S. Appl. No. 11/445,353, filed Mar. 19, 2009.

Notfication of Second Office Action for corresponding chinese Application No. 200610143131.0 dated Oct. 9, 2009 (5 pgs.).

Aggarwal et al., "MPLS Upstream Label Assignment and Context Specific Label Space," Network Working Group Internet Draft, draft-raggarwa-mpls-upstream-label-00.txt, Jan. 2005, 9 pgs.

Wijnands et al., "Multicast Extensions for LDP," Network Working Group Internet Draft, draft-wijnands-mpls-ldp-mcast-ext-00.txt, Mar. 2005, 13 pgs.

D. Awduche et al., "RFC 3209—RSVP-TE: Extensions to RSVP for LSP Tunnels," Network Working Group, Dec. 2001, 47 pgs.

RSVP-TE: Resource Reservation Protocol—Traffic Extension, Javvin Company, 2pgs., http://www.javvin.com/protocolRSVPTE.html, printed Aug. 16, 2006.

U.S. Appl. No. 11/056,383, entitled "Fast Reroute Of Traffic Associated With a Point To Multi-Point Network Tunnel," filed Feb. 10, 2005.

U.S. Appl. No. 11/215,813, entitled "Point to Multi-Point Label Switched Paths With Label Distribution Protocol," filed Aug. 29, 2005.

U.S. Appl. No. 11/192,432, entitled "Transmission of Layer Two (L2) Multicast Traffic Over Multi-Protocol Label Switching Networks," filed Jul. 28, 2005.

U.S. Appl. No. 11/445,353, entitled "Forming Multicast Distribution Structures Using Exchanged Multicast Optimization Data," filed Jun. 1, 2006.

U.S. Appl. No. 11/212,509, entitled "Aggregate Multicast Trees for Multicast Virtual Private Networks," filed Aug. 26, 2005.

U.S. Appl. No. 11/212,500, entitled "Multicast Data Trees for Multicast Virtual Private Networks," filed Aug. 26, 2005.

U.S. Appl. No. 11/212,507, entitled "Reliable Exchange Of Control Information for Multicast Virtual Private Networks," filed Aug. 26, 2005.

U.S. Appl. No. 11/213,636, entitled "Transport Of Control And Data Traffic For Multicast Virtual Private Networks," filed Aug. 26, 2005.

U.S. Appl. No. 11/213,638, entitled "Shared Multicast Trees For Multicast Virtual Private Networks," filed Aug. 26, 2005.

U.S. Appl. No. 11/212,475, entitled "Label Switching Multicast Trees For Multicast Virtual Private Network," filed Aug. 26, 2005.

U.S. Appl. No. 11/212,932, entitled "Multicast Trees For Virtual Private Local Area Network (LAN) Service Multicast," filed Aug. 26, 2005.

U.S. Appl. No. 11/213,637, entitled "Aggregate Multicast Trees for Virtual Private Local Area Network (LAN) Service Multicast," filed Aug. 26, 2005.

U.S. Appl. No. 11/212,490, entitled "Multicast Data Trees for Virtual Private Local Area Network (LAN) Service Multicast," filed Aug. 26, 2005.

U.S. Appl. No. 11/213,639, entitled "Exchange Of Control Information For Virtual Private Local Area Network (LAN) Service Multicast," filed Aug. 26, 2005.

U.S. Appl. No. 11/213,640, entitled "Auto-Discovery Of Multicast Virtual Private Networks," filed Aug. 26, 2005.

U.S. Appl. No. 11/213,641, entitled "Inter-Autonomous System (AS) Multicast Virtual Private Networks," filed Aug. 26, 2005.

* cited by examiner

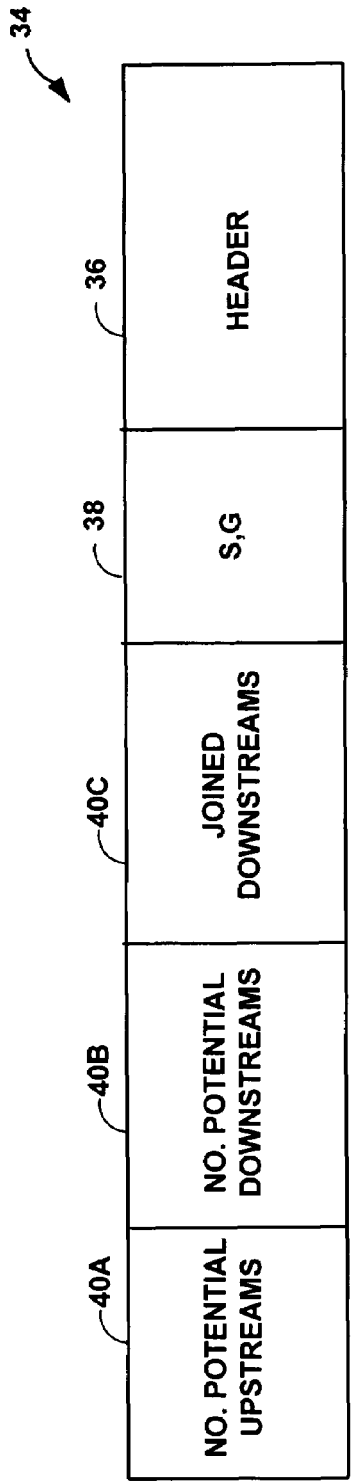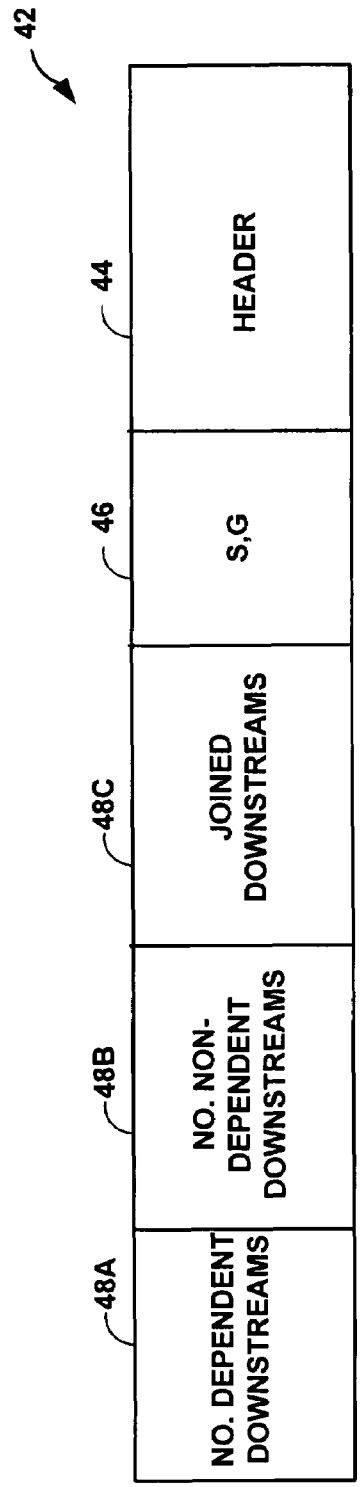
FIG. 2A
FIG. 2B

| DEVICE | SOURCE | GROUP | NPU | NPD | JD | NDD | NNDD |
|---|---|---|---|---|---|---|---|
| 10.1.1.2 | 224.0.1.195 | 1 | 2 | 0 | 0 | 0 | 0 |
| 10.1.1.2 | 224.0.1.195 | 2 | 2 | 0 | 0 | 0 | 0 |
| 10.1.1.2 | 224.0.1.200 | 1 | 1 | 2 | 1 | 1 | 1 |
| 10.1.1.6 | 224.0.1.195 | 1 | 2 | 2 | 1 | 1 | 1 |
| 10.1.1.6 | 224.0.1.195 | 2 | 2 | 2 | 0 | 1 | 1 |
| ••• | | | | | | | |
| 10.1.8.7 | 224.0.1.195 | 1 | 1 | 2 | 0 | 0 | 2 |

FIG. 6

FORMING EQUAL COST MULTIPATH MULTICAST DISTRIBUTION STRUCTURES

This application claims the benefit of U.S. Provisional Application Ser. No. 60/763,302, filed Jan. 30, 2006, the entire content of which is incorporated herein by reference.

TECHNICAL FIELD

The invention relates to computer networks and, more particularly, to transmission of multicast content within a computer network.

BACKGROUND

A computer network is a collection of interconnected computing devices that exchange data and share resources. There are a number of approaches for communicating the data between the computing devices within the network. One approach, known as "multicasting," makes use of multicast trees allowing a source device to send a single data packet for distribution to a group of one or more recipient computing devices. With multicasting, the source device assigns a multicast identifier to the data, enabling each computing device of the group to receive a copy of the data. In some cases, the source device sends multicast packets over the network to a router configured for multicasting. In turn, the router replicates the packets and forwards copies of the packets to other multicast-enabled routers. The other routers, in turn, replicate the packets and repeat the forwarding process so that each of the recipient devices receives copies of the packets. In this manner, multicast packets are delivered through one or more networks using a multicast tree.

Consumers may switch between different multicast content provided by a content provider or multiple content providers by submitting "multicast action requests." In particular, the multicast action requests allow consumers to join and leave the various multicast groups associated with the multicast identifiers. An exemplary protocol for issuing multicast action requests, such as a join request, is the Internet Group Management Protocol (IGMP). To join a particular multicast group, receiving devices send multicast join requests to upstream (i.e., intermediate) routers, which in turn forward the join request to the source device.

SUMMARY

In general, the invention is directed to techniques for improving efficiency of multicast transmission in the network. Instead of establishing a single distribution structure (e.g., tree) for a given multicast group and source, the techniques may allow devices to set up multiple multicast distribution structures for a given multicast group and source. According to the techniques, a multicast protocol may be extended to include an instance number in the control messages used to set up a multicast distribution structure, where the instance number corresponds to one of a plurality of instances for the multicast group and source. The source device may then select one of the plurality of multicast distribution structures to use for sending the multicast content, for example using a unicast Equal Cost Multipath (ECMP) hashing algorithm.

Each receiving node knows (e.g., by configuration or discovery protocol) the width of the ECMP, i.e., the number N of the plurality of instances for a multicast group and source. Each receiving node then sends N join messages, each having a different instance number, distributed among the upstream devices. In this manner, N multicast trees may be formed, but since the source device selects only one of the plurality of multicast trees to send multicast content, each receiving device only receives one copy of the multicast content from the source device. The join messages may be sent using an extended Protocol-Independent Multicast (PIM) protocol or point-to-multipoint (P2MP) label distribution protocol (LDP). Although described for exemplary purposes with respect to IP multicast, the principles of the invention may also be applied to building multicast trees in other environments, such as LDP, P2MP, or multi-protocol label switching (MPLS) environments.

In one embodiment, a method of forming multicast distribution structures within a network comprises joining, at a device, a plurality of instances N of a multicast group from a single source device, wherein each of the N instances corresponds to a different multicast distribution structure within the network for the multicast group.

In another embodiment, a using multicast distribution structures within a network comprises selecting, at a source device for a multicast group, one of a plurality of instances N for the multicast group, and sending multicast content for the multicast group to the device via the multicast distribution structure corresponding to the selected one of the N instances.

In further embodiment, a network device comprises a control unit storing configuration data that specifies an instance number N, and a multicast protocol executing within the control unit that, based on the instance number N, generates Njoin requests for a plurality of instances N of a multicast group, wherein each of the N instances corresponds to a different multicast distribution structure for the multicast group. Each of the join requests specifies a different one of the N instances of the multicast group to be joined. The network device also includes an interface to output the join requests to a plurality of upstream devices located between the network device and a source device for the multicast group to join the multicast group.

In yet another embodiment, a system comprises a source device that provides multicast content for a multicast group, and a network device coupled to the source device via a plurality of upstream devices located between the network device and the source device. The network device sends a join request for each of a specified plurality of instances N for a multicast group from the network device to the plurality of upstream routers. Each of the N instances corresponds to a different multicast distribution structure for the multicast group, and each of the join requests specifies a different one of the N instances to be joined. The source device selects one of the N instances and sends the multicast content for the multicast group to the network device via the multicast distribution structure corresponding to the selected one of the N instances.

In another embodiment, a computer-readable medium comprises instructions for causing a programmable processor to specify a plurality of instances N for a multicast group from a single source device, wherein each of the N instances corresponds to a different multicast distribution structure for the multicast group. The instructions further cause the programmable processor to send a join request for each of the N instances from the device to a plurality of upstream routers located between the device and the source device for the multicast group. Each of the join requests specifies a different one of the N instances of the multicast group to be joined.

The details of one or more embodiments of the invention are set forth in the accompanying drawings and the descrip-

BRIEF DESCRIPTION OF DRAWINGS

FIG. 2A is a block diagram illustrating an exemplary packet format for use by a downstream device in sharing multicast optimization data with an upstream device in a system to improve multicasting efficiency.

FIG. 2B is a block diagram illustrating an exemplary packet format for use by an upstream device in sharing multicast optimization data with a downstream device in a system to improve multicasting efficiency.

FIG. 6 is a block diagram illustrating an example data structure storing multicast optimization data.

DETAILED DESCRIPTION

Figure 1A:
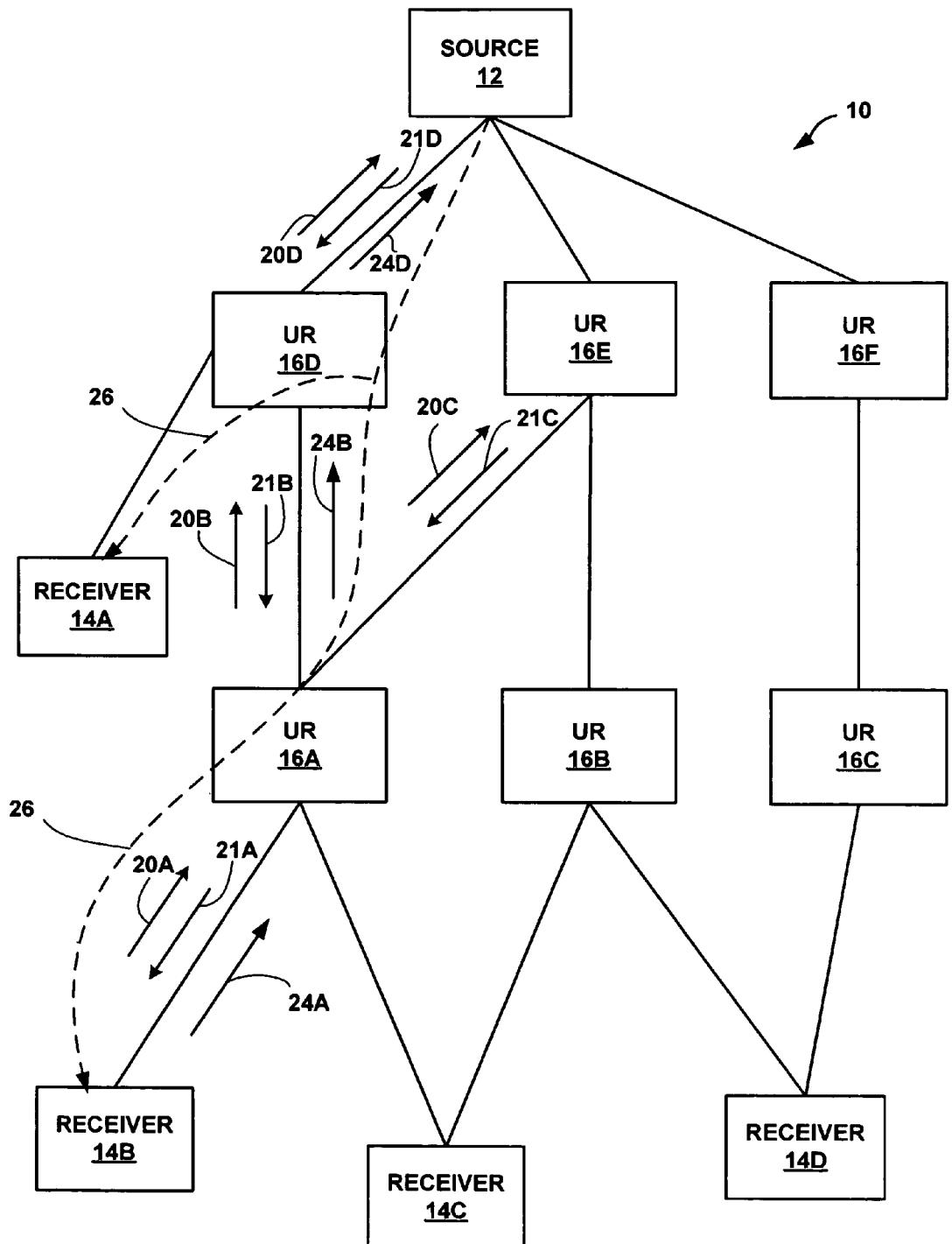
FIGS. 1A-1D are a series of block diagrams illustrating an example system in which receiver devices and intermediate routers exchange multicast optimization data (MOD) and select upstream routers for receiving multicast traffic in a manner consistent with the principles of the invention.

FIG. 1A is a block diagram illustrating an example system 10 in which receivers 14A-14D (collectively, receivers 14) select one or more routers for receiving multicast traffic from source device 12 in a manner consistent with the principles of the invention. Source device 12 provides content, such as Internet Protocol (IP) video services, IP television (IPTV), desktop conferences, corporate broadcasts, or other content, to receivers 14. For example, source device 12 may provide content in the form of multicast data packet streams to one or more multicast groups that receivers 14 have joined. Each multicast data packet includes a multicast identifier that identifies the respective multicast group. Routers 16A-16F (collectively, routers 16) may maintain information associating the receivers 14 with the multicast groups, and transmit copies of the multicast data packets from source device 12 to the receivers 14.

The invention will be described for exemplary purposes with respect to using IP multicast to build multicast trees. However, the techniques may also be applied to building multicast distribution structures in other environments, such as label distribution protocol (LDP), point-to-multipoint (P2MP), or multi-protocol label switching (MPLS) environments. For example, a multicast stream may be sent over a label switched path (LSP), e.g., a P2MP LSP, as described in "Point to Multi-Point Label Switched Paths with Label Distribution Protocol," U.S. application Ser. No. 11/215,813, filed Aug. 29, 2005, the entire content of which is incorporated herein by reference.

The configuration of system 10 illustrated in FIG. 1A is merely exemplary. For example, system 10 may include additional source devices (not shown). In general, source device 12 represents any source of multicast content, such as a video server. Moreover, receivers 14 may include any type of device capable of receiving multicast content, such as personal computers, laptop computers, handheld computers, workstations, servers, digital televisions, network-enabled cell phones and the like.

Receivers 14 may interact with routers 16 via the Internet Group Management Protocol (IGMP) or some other multicasting protocol to issue multicast action requests. Receivers 14 may, for example, issue a join or leave multicast action request to join or leave a multicast group, respectively. For example, receivers 14 may issue multicast join requests to become members of the exemplary multicast group for which routers 16 deliver multicast data packets. As another example, one of receivers 14 may issue a multicast leave action request (also called a "prune" action request) to leave a group, thereby terminating content delivery from its respective router 16. In a similar manner, receivers 14 may issue multicast action requests to routers 16 to switch between multicast groups, allowing receivers 14 to access different content provided by source device 12.

In accordance with the principles of the invention, receivers 14 and routers 16 may exchange messages containing information with respect to the multicast groups of which they are members, and the number of upstream or downstream devices to which they are connected that are either capable of or already providing multicast content for the groups. Receivers 14 as well as routers 16 may use this information to intelligently select an "upstream" router to which to issue a multicast join request. In making the decision, the receiving device may monitor conditions of system 10 and utilize any of a variety of criteria to rank the upstream routers 16, such as minimization of multicast traffic duplication, load balancing current bandwidth levels, and avoiding paths experiencing communication delays.

Whether a router is an "upstream" router between a receiver and a source may depend on the definition of "upstream" used by the devices. Every router in the network should have the same definition of "upstream." For example, according to one definition of "upstream," a router is an upstream router for a given receiver and a given source if the distance from the source to the particular router is less than the distance from the source to the receiver, where the distances are determined according to the Internet Gateway Protocol (IGP) metric. According to another definition of "upstream," a router is an upstream router for the receiver and the source if the distance from the router to the source is less than the distance from the destination to the source. This definition may provide different results than the first definition since the IGP metric between two devices may be non-symmetric. Yet another set of definitions add an additional requirement that an upstream router must be on the shortest path from the particular router to the source (or from the source to the router, respectively), as defined by IGP metrics. Moreover, a given router may both an upstream router in some contexts and a downstream router in other contexts, depending on its relationship to a given source and receiver.

In the example of FIG. 1A, assume system 10 currently has a single multicast stream 26 originating from source 12 and delivered only to receiver 14A. In addition, assume receiver 14B wishes to join the exemplary multicast group <SOURCE 12, GROUP 1> associated with multicast stream 26. Consequently, receiver 14B initially sends a multicast optimization (MO) packet 20A to every upstream router to which receiver 14B is connected, i.e., router 16A. MO packet 20A may, for example, inform router 16A as to the number of upstream routers to which receiver 14B is connected, as well as the number of upstream routers from which receiver 14B could receive multicast traffic for the particular source and group <SOURCE 12, GROUP 1> associated with multicast stream 26.

In this example, router 16A is the only upstream router associated with receiver 14B, so MO packet 20A would inform router 16A that receiver 14B has only a single upstream router for receiving multicast traffic for the group <SOURCE 12, GROUP 1>. MO packet 20A may also inform router 16A how many downstream devices receiver 14B has that may potentially join a group, and how many downstream devices receiver 14B has that are already members of a group. Here, receiver 14B has no such downstream devices in either category. When router 16A receives MO packet 20A, router 16A may save the information contained within the packet to a database as multicast optimization data (MOD).

In response, router 16A sends an MO reply packet 21A to receiver 14B. MO reply packet 21A may, for example, inform receiver 14B as to the number of dependent and non-dependent downstream devices router 16A has, and whether any dependent devices have already joined the multicast group. The term dependent downstream device is used to refer to a device that is dependent upon the router, i.e., the router is the only upstream router from which the downstream device can receive a multicast stream. The term non-dependent downstream device is used to refer to a device that may potentially receive a multicast stream from the router for a group, but that is also connected to other upstream routers from which the downstream device may receive the multicast stream.

In this case, MO reply packet 21A informs receiver 14B that router 16A has a single dependent downstream device (i.e., receiver 14B), one non-dependent downstream device (i.e., receiver 14C), and zero joined downstream devices. Router 16A may have previously been made aware that receiver 14C is a non-dependent downstream device by a similar MO packet 20 (not shown) received from receiver 14C. In this manner, receiver 14B learns whether any peer devices downstream of router 16A have already joined the multicast group, and whether the peer devices may be dependent upon router 16A to receive multicast traffic in the future.

When receiver 14C receives the MO reply packet 21A, receiver 14C may save the multicast optimization data contained within the packet to a data structure. In addition, receiver 14C sends a join request 24A to router 16A to request to join the multicast group <SOURCE 12, GROUP 1> associated with multicast stream 26.

Before or after receiver 14B has issued join request 24A to join the group, router 16A sends MO packets 20B, 20C to routers 16D and 16E, respectively. MO packets 20B, 20C may indicate that router 16A has two potential upstream routers from which router 16A could receive multicast traffic for the particular source and group of interest. MO packets 20B, 20C may also indicate that router 16A has two downstream devices (i.e. receivers 14B, 14C) and one downstream device that has joined the particular <S, G> (i.e., receiver 14B). In some embodiments, router 16A may send MO packets 20B, 20C even before receiver 14B has joined the group.

In response, routers 16D and 16E each send MO reply packets 21B, 21C, respectively, to router 16A. MO reply packet 20B indicates that router 16D has two downstream devices (i.e., receiver 14A and intermediate router 16A), one of which has already joined the group (i.e., receiver 14A). MO reply packet 21C indicates that router 16E has two downstream devices, none of which have joined the group. Based on this information, router 16A may intelligently form a multicast sub-tree. For example, as shown in FIG. 1A, router 16A may select router 16D as the upstream router from which router 16A will receive the multicast stream 26 for the <SOURCE 12, GROUP 1>, since router 16D is already receiving multicast traffic for that group from source 12. In this manner, the routers may avoid unnecessary duplication of multicast packets in system 10. As another example, router 16A may select router 16E for load balancing purposes.

Assuming router 16A selects router 16D, router 16A sends a join request 24B to the selected router 16D. Router 16D may likewise send a MO packet 20D to source device 12, receive a MO reply packet 21D from source device 12, and send a join request 24D to source device 12. Source device 12 sends multicast stream 26 for group <S, G> to router 16D, which duplicates the stream 26 and sends packets to both receiver 14A and router 16A. Router 16A then sends multicast stream 26 to receiver 14B. In one embodiment, multicast stream 26 may be sent over a label switched path (LSP), e.g., a point-to-multipoint (P2MP) LSP.

In this manner, multicast optimization data (MOD) is propagated upstream and downstream to local devices to allow downstream devices to intelligently select optimal upstream devices for a particular multicast group, thereby forming optimal multicast distribution structures (e.g., trees and sub-trees) and increasing the efficiency of multicasting within system 10. The MO packets 20, 21 may be sent as an extension to an existing routing protocol, e.g., Open Shortest Path First (OSPF), or an existing multicast protocol, such as IGMP, Protocol-Independent Multicast (PIM), Distance Vector Multicast Routing Protocol (DVMRP), Multicast OSFP (MOSFP), or Multicast Transport Protocol (MTP), or as a separate protocol specifically designed for exchanging MOD. The devices may send the MO packets periodically, only when a change has occurred to the multicast optimization data, or in response to multicast action requests.

For example, the multicast optimization data may indicate one or more of a number of other devices downstream from the respective upstream device that have already joined the multicast group, a number of dependent downstream devices for which the upstream device is the only potential upstream device that can provide the multicast data for the multicast group, a number of non-dependent downstream devices capable of receiving the multicast data from the upstream device or at least one other upstream device, a number of potential upstream devices, a number of potential downstream devices. As other examples, the MOD may indicate a distance from a source of the multicast group to the respective upstream device, a distance to the source from the respective upstream device, a delay from the source to the respective upstream device, a number of multicast groups transiting the upstream device, and a total multicast bandwidth transiting the upstream device.

Figure 1B:
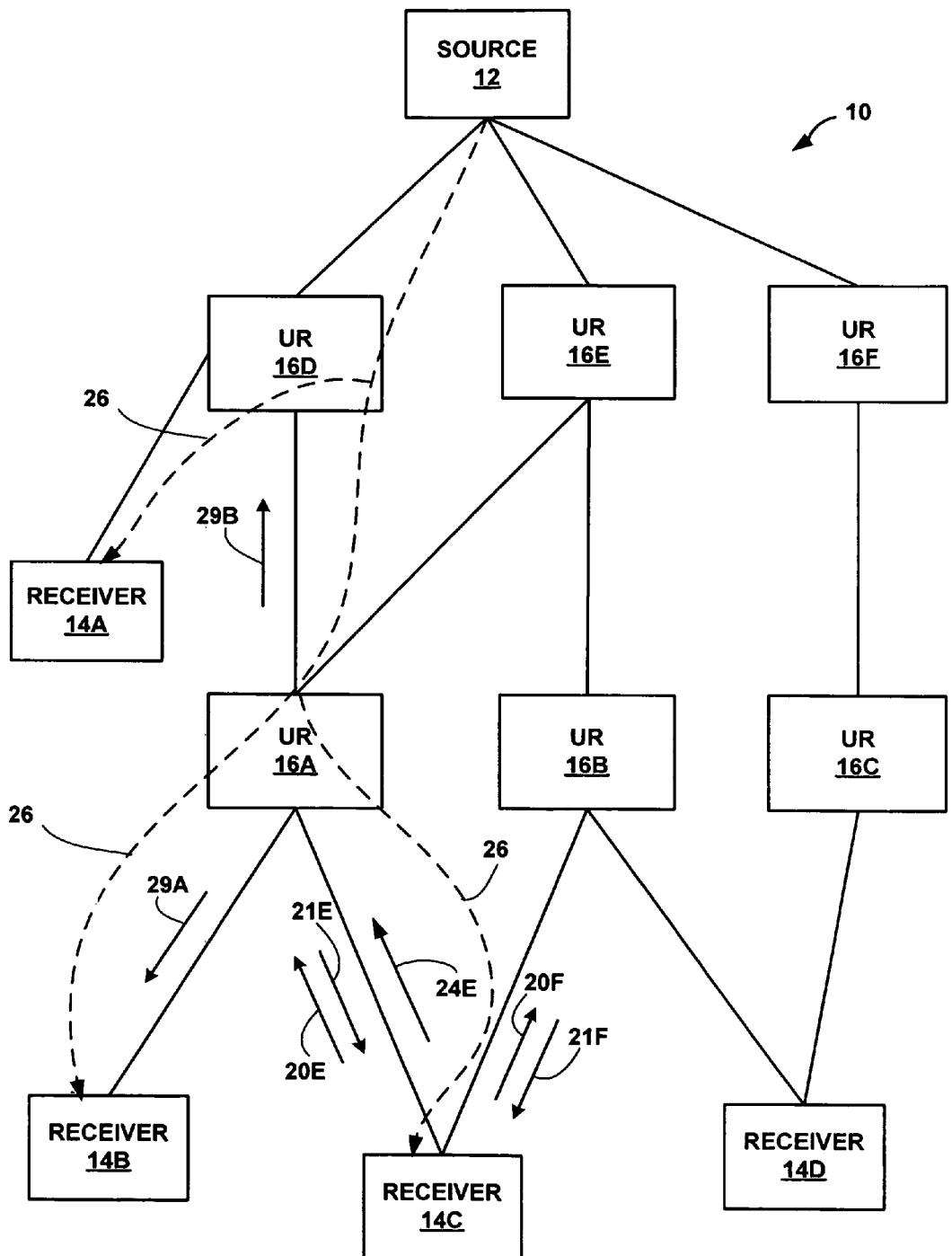

With respect to FIG. 1B, assume that receiver 14C subsequently wishes to receive multicast content associated with multicast stream 26. As illustrated in FIG. 1B, receiver 14C sends MO packets 20E, 20F to upstream devices 16A and 16B, respectively. MO packets 20E, 20F may indicate that receiver 14C has two potential upstream devices from which receiver 14C could receive multicast traffic for group <SOURCE 12, GROUP 1>. MO packets 20E, 20F may also indicate that receiver 14C has zero potential downstream devices and zero joined downstream devices.

In response, routers 16A and 16B may each send MO reply packets 21E, 21F, respectively, to receiver 14C. MO reply packet 21E indicates that router 16A has one downstream device that has already joined the group (i.e., receiver 14B). MO reply packet 21F indicates that router 16B has no downstream devices having already joined the group. Based on this information, receiver 14C may intelligently select an upstream router from which receiver 14C will receive the multicast stream for the group. In this example, receiver 14C selects router 16A because router 16A is already receiving multicast traffic for the group. In this manner, the upstream routers may avoid unnecessary duplication of multicast packets in system 10. Alternatively, receiver 14C may have utilized other criteria as described above.

Assuming receiver 14C selects router 16A, receiver 14C sends a join request 24E to router 16A. Router 16A adds receiver 14C as a joined downstream device, and proceeds to duplicate the multicast stream 26 for the particular <S, G> associated with multicast data stream 26 to send copies of the packets to both receivers 14B and 14C. In some embodiments, router 16A may send an MO update message 29A to receiver 14B and an MO update message 29B to router 16D, indicating that router 16A now has two joined downstream devices for the particular <S, G>.

Figure 1C:
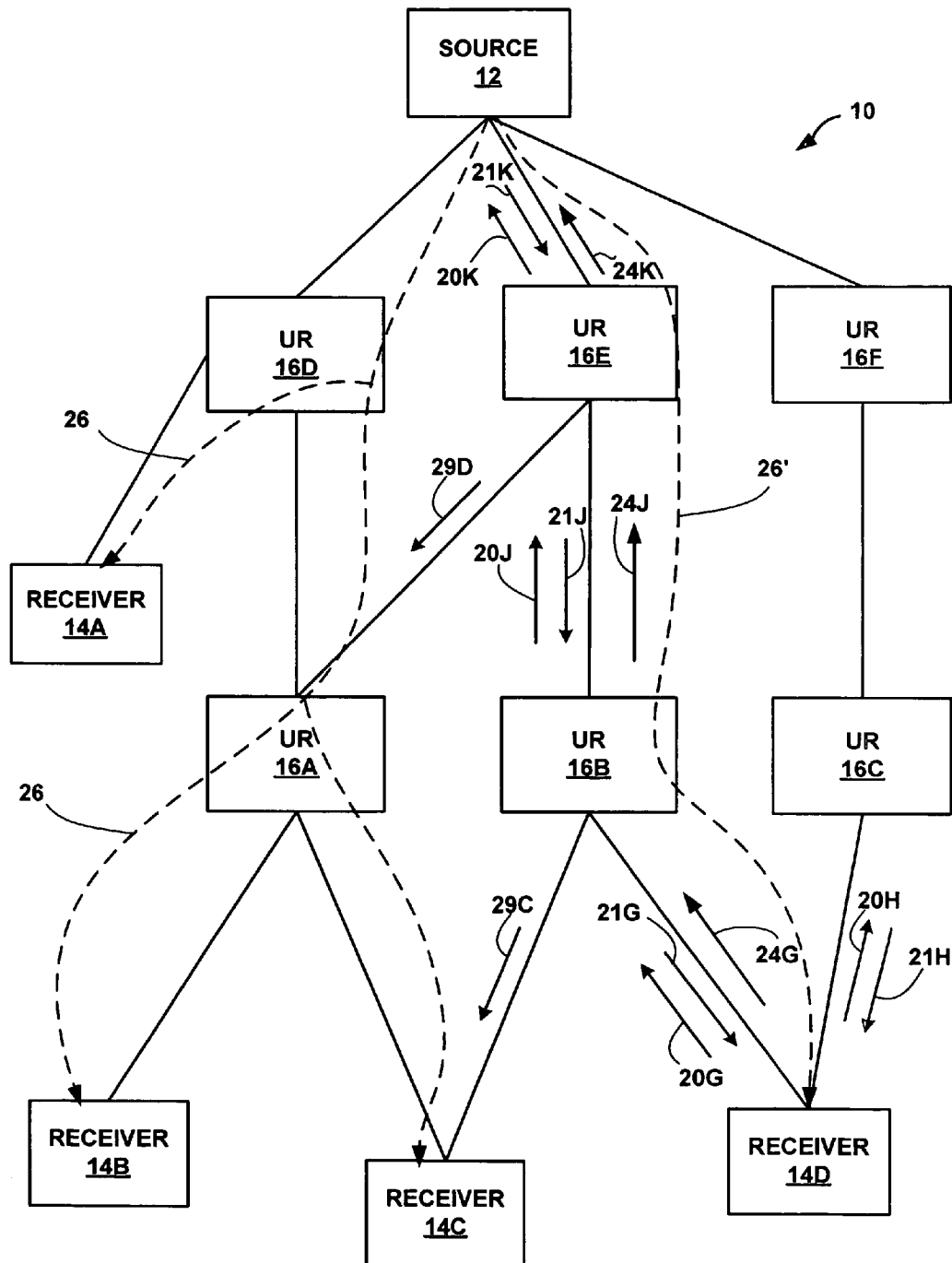

With respect to FIG. 1C, assume that receiver 14D subsequently wishes to receive multicast content associated with multicast stream 26. As illustrated in FIG. 1C, receiver 14C sends MO packets 20G, 20H to routers 16B and 16C, respectively. MO packets 20G, 20H may indicate that receiver 14D has two potential upstream devices from which receiver 14D could receive multicast content for group <SOURCE 12, GROUP 1>. MO packets 20G, 20H may also indicate that receiver 14D has zero potential downstream devices and zero joined downstream devices.

In response, or previously, routers 16B and 16C may send MO reply packets 21G, 21H, respectively, to receiver 14D. MO reply packet 21G indicates that router 16B has a downstream device (i.e., receiver 14C) that has already joined the particular group of interest through an upstream router other than router 16B. MO reply packet 21H indicates that router 16C has no downstream devices having already joined the group.

Based on this information, receiver 14D may intelligently select router 16B as the upstream router from which receiver 14D will receive the multicast stream for the group. In addition, receiver 14D may also consider information about other groups having multicast streams (not shown) going through routers 16B and 16C, and select an upstream router so as to provide load balancing to system 10. In this example, receiver 14D sends a join request 24G to router 16B.

Router 16B may send MO update message 29C to receiver 14C indicating that router 16B now has a joined downstream device for the group <SOURCE 12, GROUP 1>. Receiver 14C may save the information contained within MO update message 29C as multicast optimization data in a database. Router 16B may propagate the MO information and join request upstream to router 16E, in a manner similar to that discussed above with respect to router 16A in FIG. 1A. When router 16E receives the join request 24J from router 16B, router 16E may send an MO update message 29D to router 16A indicating that router 16B now has a joined downstream device for the group <SOURCE 12, GROUP 1>. Router 16E propagates the information upstream and sends a join request 24K to source 12. Source device 12 then sends multicast stream 26' for the group <SOURCE 12, GROUP 1> to router 16E, which sends multicast stream 26' to router 16B. Router 16B then sends multicast stream 26' to receiver 14D.

Figure 1D:
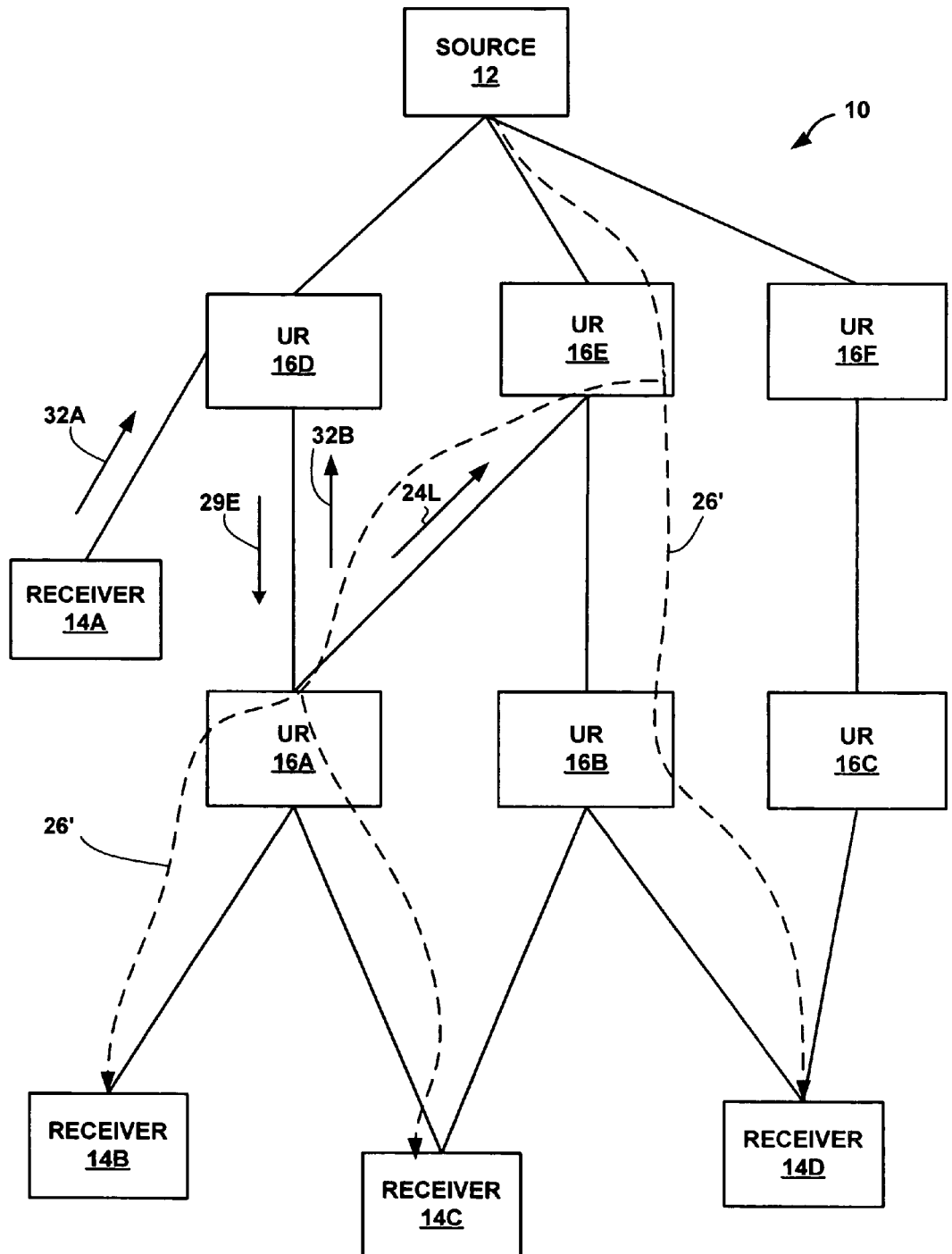

With respect to FIG. 1D, assume that receiver 14A subsequently leaves the multicast group <SOURCE 12, GROUP 1>. As illustrate in FIG. 1D, receiver 14A sends a leave request 32A to router 16D to request to leave multicast group <SOURCE 12, GROUP 1>. Router 16D removes receiver 14A from the group, and stops sending the multicast stream to receiver 14A.

In addition, router 16D sends an MO update message 29E to router 16A, indicating that router 16D now only has one downstream device that is a member of group <SOURCE 12, GROUP 1>. With respect to this particular multicast group, router 16A may intelligently use this information to switch upstream routers from router 16D to router 16E based on MO update message 29D from router 16E (FIG. 1C) indicating that router 16E is receiving a multicast stream 26' for the same group <SOURCE 12, GROUP 1>. Router 16A may therefore send a leave request 32B to router 16D to request to leave the group, and may send a join request 24L to router 16E to join the group. Router 16E adds router 16A as a downstream device in the group, and sends multicast stream 26' to router 16A, resulting in the new multicast tree illustrated in FIG. 1D.

FIG. 2A is a block diagram illustrating an exemplary format for a multicast optimization packet 34 for use by a downstream device in sharing multicast optimization data with an upstream device. Packet 34 may be a packet used by an extended multicast protocol or an extended routing protocol. Alternatively, packet 34 may be used by a separate protocol designed for multicast optimization. A downstream device may, for example, send packet 34 to all of its upstream devices in anticipation of joining a group <S, G> to share multicast optimization data (MOD) with and obtain MOD about neighboring devices. In this way the downstream device may intelligently select an upstream device to which to send a join request to join the particular multicast group.

In the example of FIG. 2A, packet 34 contains a header 36 containing typical packet source and destination information. For example, header 36 may contain IP addresses, ports, protocol or other information. Packet 34 also contains a group identification field 38 ("ID") that contains a group identifier, for example, the source device and the group number that identifies the respective multicast group to which the subsequent data applies. As another example, the group identifier may be a multicast address.

MOD fields 40A-40C (collectively, MOD fields 40) contain information that a downstream device may share to help optimize multicast transmission. For example, MOD field 40A contains a number of upstream devices to which a downstream device is connected and from which the downstream device could potentially receive multicast traffic for the specific multicast group. MOD field 40B contains the number of downstream devices connected to the downstream device sending packet 34 that may potentially issue joins to receive multicast traffic for the multicast group. MOD field 40C contains a number of devices downstream to the device sending packet 34 that have actually joined the particular multicast group. The MOD fields 40 shown are merely exemplary, and other types of multicast optimization data may be included in packet 34. Moreover, this or other information for multiple multicast groups may be conveyed in a single packet.

FIG. 2B is a block diagram illustrating an exemplary multicast optimization reply packet 42 for use by an upstream device in sharing multicast optimization data with a downstream device. The receipt of packet 34 (FIG. 2A) from a downstream device may trigger the receiving upstream device to send a corresponding reply packet 42 containing other MOD about neighboring devices of the upstream device. Alternatively, an upstream device may send reply packet 42 periodically, as configured by an administrator, or in response to multicast action requests. Regardless, the upstream device may communicate multicast optimization information to neighboring devices via one or more packets conforming to the format of packet 34 to increase efficiency in multicasting.

Reply packet 42 contains a header 44 indicating the source and destination information for the reply packet, and a group ID field 46 that identifies a particular multicast group at issue. MOD fields 48A-48C (collectively, MOD fields 48) contain information that an upstream device may share to aid the selection and formation of optimal multicast trees within a network. In this example, MOD field 48A contains the number of downstream devices for which the upstream device sending packet 42 is the only upstream device able to deliver multicast traffic for the identified multicast group (i.e., dependent downstream devices). MOD field 48B contains the number of downstream devices that may potentially receive a multicast stream from the upstream router, but that are also connected to other upstream routers from which to receive the multicast stream for the multicast group (i.e., non-dependent downstream devices). MOD field 48C contains the number of devices downstream to the device sending packet 42 that have actually joined the multicast group. The MOD fields 48 shown are merely exemplary, and other types of multicast optimization data may be included in packet 42. Moreover, this or other information for multiple multicast groups may be conveyed in a single packet.

Figure 3:
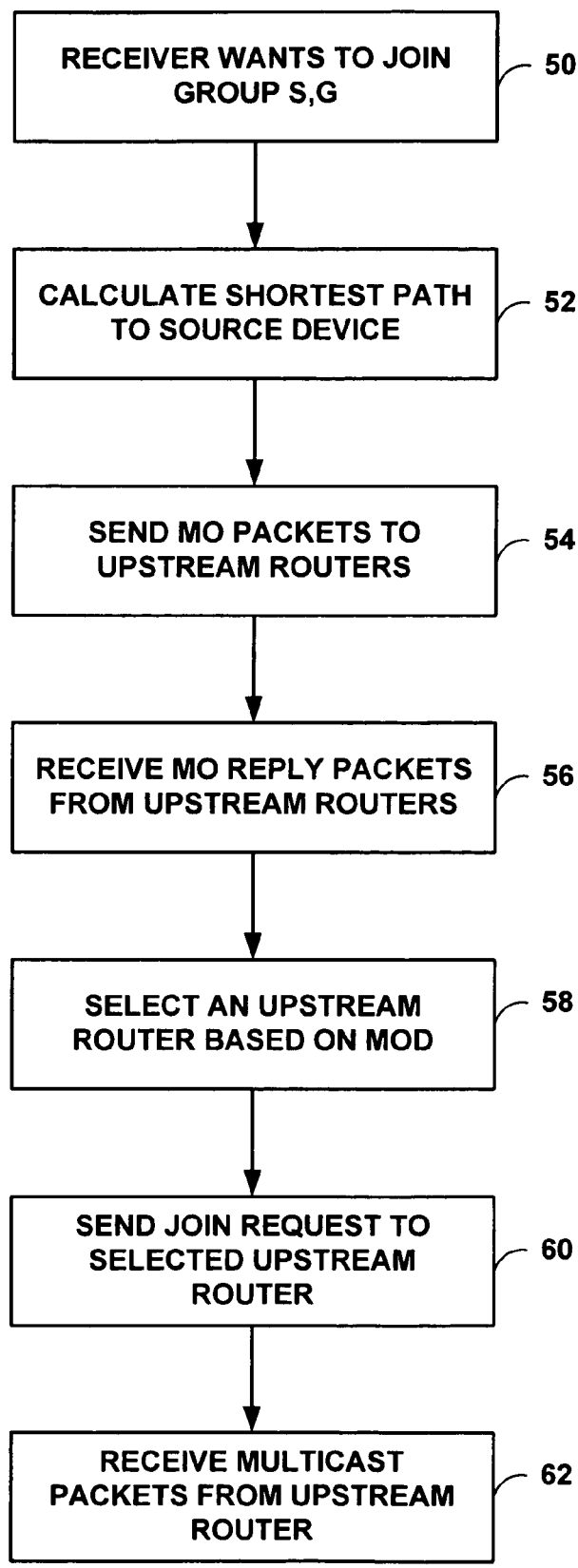
FIG. 3 is a flowchart illustrating example operation of a receiver in sharing multicast optimization data with neighboring upstream routers.

FIG. 3 is a flowchart illustrating example operation of a receiver, such as any of receivers 14 of FIGS. 1A-1D, in sharing multicast optimization data with neighboring upstream routers. FIG. 3 will be described with respect to receiver 14C.

Initially, receiver 14C desires to receive a multicast stream for group <S, G> (typically in response to a user request), causing receiver 14C to join the group (50). Receiver 14 determines potential upstream routers (52), depending on the appropriate definition of "upstream." In some embodiments, receiver 14 may calculate a shortest path to the source device. There may be multiple paths that have an equal cost metric to the source, and receiver 14C may use MOD to choose between the shortest paths. Alternatively, receiver 14C may not calculate a shortest path, and instead may consider all potential paths to the source device. In any case, receiver 14C will need to decide to which upstream router to send a join request.

Receiver 14C sends a multicast optimization (MO) packet 34 (FIG. 2A) to each of the upstream routers on all paths to the source or a subset based on a cost metric or length, i.e., to upstream routers 22A and 22B (54). Receiver 14C then receives a MO reply packet 42 (FIG. 2B) from each of the upstream routers (56). Receiver 14C may save the multicast optimization data contained within the MO reply packets to a database. Receiver 14C selects an upstream router based on the multicast optimization data (58). For example, receiver 14C may consider whether an upstream router is already receiving multicast traffic for the group. As another example, receiver 14C may utilize any of a variety of criteria to rank the routers 16, such as minimization of multicast traffic duplication, load balancing current bandwidth levels, and avoiding paths experiencing communication delays. Receiver 14C sends a join request to the selected upstream router (60) and receives multicast packets from the selected upstream router (62).

Figure 4:
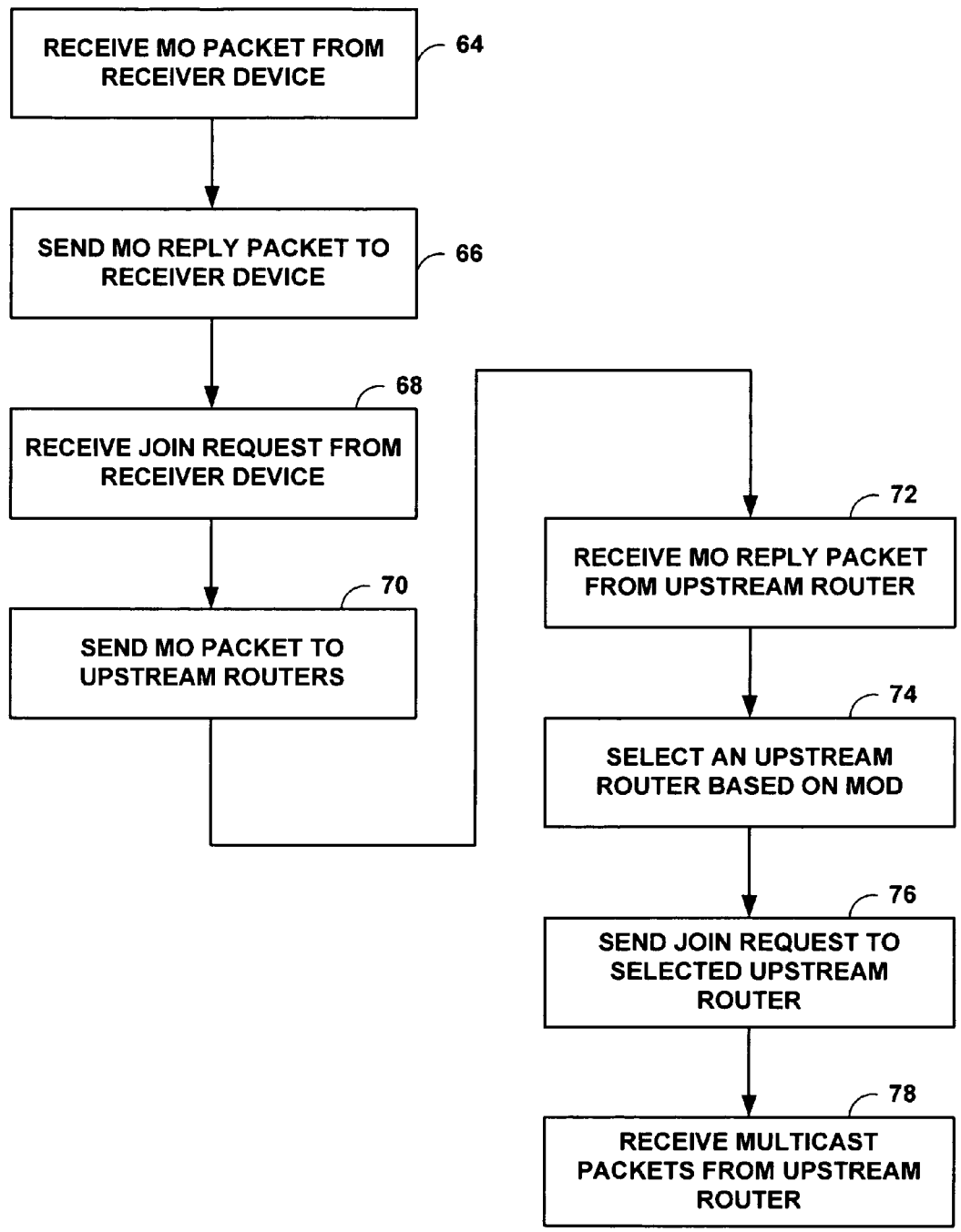
FIG. 4 is a flowchart illustrating example operation of an upstream router in sharing multicast optimization data with neighboring devices.

FIG. 4 is a flowchart illustrating example operation of an upstream router, such as any of routers 16 of FIGS. 1A-1D, in sharing multicast optimization data with neighboring devices. FIG. 4 will be described with respect to router 16A. Router 16A may receive an MO packet 34 (FIG. 2A) from one or both of receivers 14B and 14C (64). For example, router 16A may receive an MO packet from receiver 14B indicating that receiver 14B has only one upstream router for this group, i.e., that receiver 14B is dependent on router 16A to receive multicast content for the respective group. Router 16A may also receive an MO packet from receiver 14C indicating that receiver 14C has two potential upstream routers for this group.

Router 16A sends an MO reply packet 42 (FIG. 2B) to one or both of receivers 14B and 14C (66). The MO reply packet 42 may indicate, for example, that router 16A has one dependent downstream device, and one non-dependent downstream device. Router 16A is thus sharing the MO data received from each of its downstream devices with all of the other downstream devices. In this manner, router 16A facilitates the exchange of information in system 10, so that downstream devices may intelligently select an optimal upstream router for receiving multicast.

Router 16A may receive a join request from a receiver (68). If router 16A is not already receiving multicast packets for the requested group, router 16A may propagate the MO data and join requests to the next upstream device. In some embodiments, router 16A may optionally calculate the shortest path to the source device. Router 16A may send MO packets 34 to other routers upstream of router 16A, i.e., routers 16D and 16E (70), and may receive MO reply packets 42 from routers 16D and 16E (72). Router 16A may select an upstream router from which to receive the multicast content for the group based on the received multicast optimization data (74), send a join request to the selected upstream router (76), and receive multicast packets from the selected upstream router (78).

Figure 5:
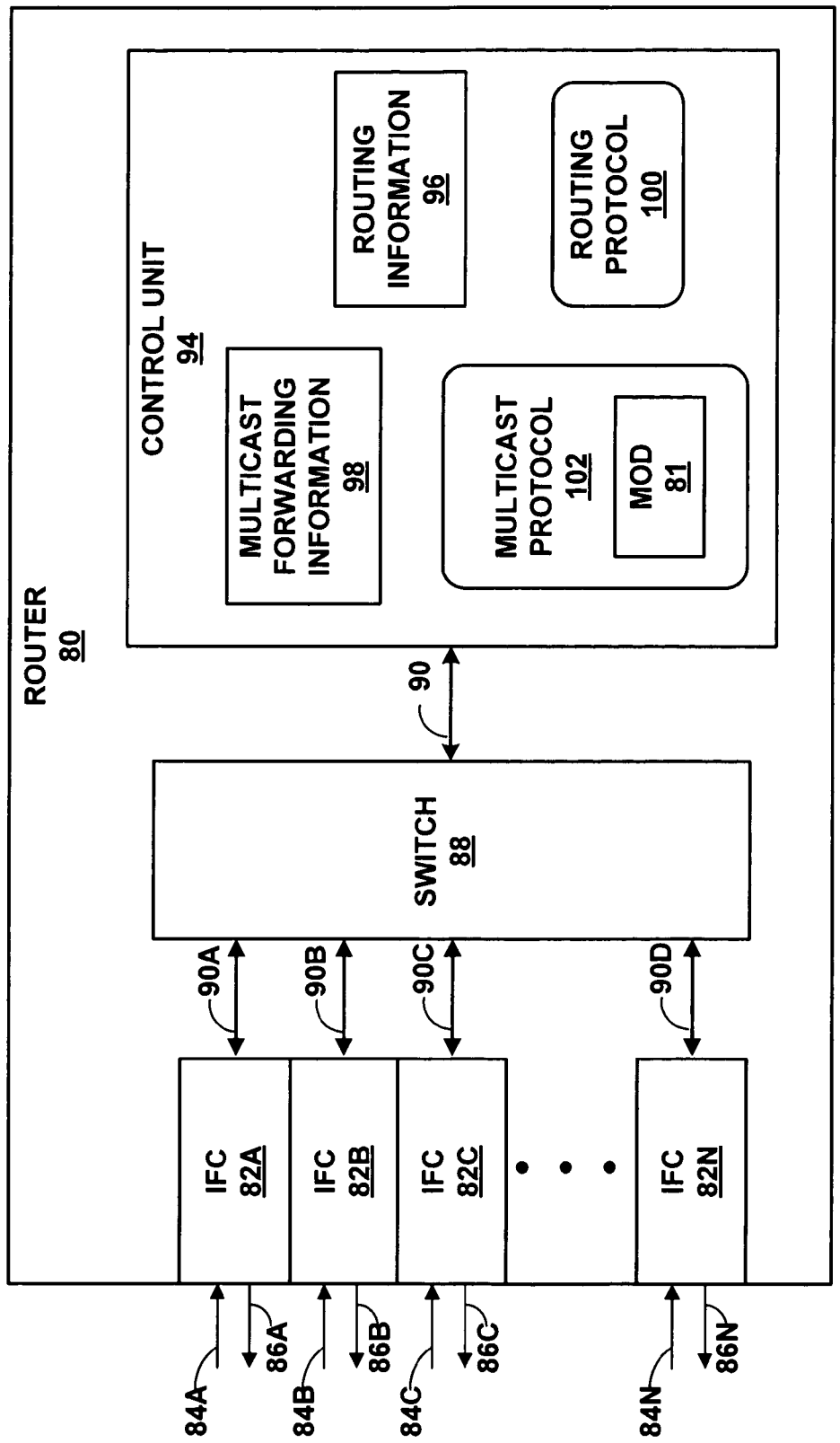
FIG. 5 is a block diagram illustrating an exemplary router that distributes or receives multicast optimization data in accordance with an embodiment of the invention.

FIG. 5 is a block diagram illustrating an exemplary router 80 that stores, distributes, and receives multicast optimization data (MOD) 81 in accordance with an embodiment of the invention. Router 80 may operate substantially similar to routers 16 in FIGS. 1A-1D. In some cases, router 80 may be an edge router and receivers 14 may connect to router 80 via network switches, e.g., DSLAMs or Ethernet switches. Alternatively, router 80 may be an intermediate router that is not directly connected to receivers 14. In general, router 80 is capable of receiving and sending MO packets and MO reply packets containing MOD 81.

In the illustrated embodiment, router 80 includes interface cards 82A-82N ("IFCs 82") that receive packets on inbound links 84A-84N ("inbound links 84") and send packets on outbound links 86A-86N ("outbound links 86"). IFCs 82 are interconnected by a high-speed switch 88 and links 90. In one example, switch 88 comprises switch fabric, switchgear, a configurable network switch or hub, and the like. Links 90 comprise any form of communication path, such as electrical paths within an integrated circuit, external data busses, optical links, network connections, wireless connections, or other type of communication path. IFCs 82 are coupled to inbound links 84 and outbound links 86 via a number of interface ports (not shown).

Router 80 also includes a control unit 94 that maintains routing information 96 to reflect the current topology of a network and other network entities to which router 80 is connected. In general, when router 80 receives a unicast packet via one of inbound links 84, control unit 94 determines a destination for the packet in accordance with routing information 96 and outputs the packet on one of outbound links 86 based on the destination.

Control unit 94 further maintains multicast forwarding information 98. When router 80 receives a multicast packet via one of inbound links 84, control unit 94 forwards the packet on a set of outbound links 86 in accordance with multicast forwarding information 98. Control unit 94 provides an operating environment for routing protocol 100, e.g., OSPF, LDP, MPLS, IGP, and multicast protocol 102, e.g., IGMP. Router 80 may use multicast protocol 102 to send and receive multicast action requests, e.g., join and leave requests. In other embodiments, other protocols may be executed within control unit 94.

One or both of routing protocol 100 and multicast protocol 102 may be, for example, extended in a manner that allows multicast optimization data 81 to be conveyed to and received from other devices for optimizing multicasting. As described herein, the protocol extension allows a variable number of MOD fields to be communicated to other devices. In other embodiments, a separate protocol may be established for exchanging MOD 81. For example, a number of potential upstream devices, a number of potential downstream devices, a number of joined downstream devices, a number of dependent downstream devices, a number of non-dependent downstream devices, or other MOD may be specified in accordance with the techniques described herein.

In the example of FIG. 5, multicast protocol 102 maintains MOD 81. Router 80 may use multicast protocol 102 or routing protocol 100 to send MOD packets via one of outbound links 86 and receive MOD reply packets via one of inbound links 84 containing MOD, or to send and receive MO update messages. When router 80 sends an MOD packet, which may be similar to MOD packet 34 of FIG. 2A, router 80 may fill the fields of the MOD packet with data from MOD 81. When router 80 receives an MOD reply packet, which may be similar to MOD reply packet 42 of FIG. 2B, router 80 may save the information contained within the fields of the MOD reply packet to MOD 81. Control unit 94 maintains routing information 98, multicast forwarding information 98, and MOD 81 in the form of one or more tables, databases, link lists, radix trees, databases, flat files, or any other data structures.

In operation, router 80 applies MOD 81 when determining an upstream router to send a join request for a particular group. In particular, when router 80 needs to join a group, router 80 may send and receive MOD packets and MOD reply packets containing MOD 81 to learn about multicast content actually or potentially being transmitted to neighboring devices for the group. Router 80 may use the MOD 81 to determine which upstream router to send the join request. More specifically, router 80 may consider whether multicast content for the group is already being received by one of the upstream routers. Router 80 may also use MOD 81 to allow for load-balancing considerations in selecting an upstream router for receiving multicast content.

The architecture of router 80 illustrated in FIG. 5 is shown for exemplary purposes only. The invention is not limited to this architecture. In other embodiments, router 80 may be configured in a variety of ways. In one embodiment, for example, control unit 94 and its corresponding functionality may be distributed within IFCs 82. In another embodiment, control unit 94 may include a routing engine that performs routing functions and maintains a routing information base (RIB), e.g., routing information 96, and a forwarding engine that performs packet forwarding based on a forwarding information base (FIB) generated in accordance with the RIB.

Control unit 94 may be implemented solely in software, or hardware, or may be implemented as a combination of software, hardware, or firmware. For example, control unit 94 may include one or more processors that execute software instructions. In that case, the various software modules of control unit 94, such as routing protocol 100 and multicast protocol 102, may comprise executable instructions stored on a computer-readable medium, such as computer memory or hard disk.

FIG. 6 is a block diagram illustrating an example data structure 104 storing multicast optimization data. In the example of FIG. 6, example data structure 104 is maintained by the control unit of receiver 14C. For example, data structure 104 may be similar to MOD 81 maintained by control unit 94 of FIG. 5. Receiver 14C may populate the rows and columns of data structure 104 using MOD received in MO packets. Data structure 104 includes device column 106, which indicates the network device for which MOD is stored in the corresponding row. Data structure 104 also includes a source column 108 and multicast group column 110, which together indicate the multicast group <S, G>.

Column 112 of data structure 104 stores the number of potential upstream devices ("NPU") that the corresponding device has, while column 114 stores the number of potential downstream devices ("NPD") that the corresponding device has. Column 116 stores the number of joined downstream devices ("JD") that the corresponding device has, column 118 stores the number of dependent downstream devices ("NDD") that the corresponding device has, and column 120 stores the number of non-dependent downstream devices ("NNDD") that the corresponding device has. When receiver 14C receives an MO message, e.g., an MO packet, an MO reply packet, or an MO update message, the control unit of receiver 14C may enter a new row or update an existing row in data structure 104.

In the example of FIG. 6, the first three rows correspond to device 10.1.1.2, which in this example is the IP address for receiver 14C. The fourth and fifth rows correspond to device 10.1.1.6 (the IP address for router 16A), and the last row corresponds to device 10.1.8.7 (the IP address for router 16B). The first row corresponds to multicast source 224.0.0.195 (the multicast address for source device 12), group 1, and the second row corresponds to source 224.0.0.195, group 2. <Source 12, group 1> is the multicast group discussed in FIGS. 1A-1D. The third row corresponds to source 224.0.0.200, another multicast source device (not shown in FIGS. 1A-1D).

In the example of FIG. 6, receiver 14C maintains MOD about itself in data structure 104. For example, for <Source 12, group 1> and <Source 12, group 2>, receiver 14C has two potential upstream devices, zero potential downstream devices, and consequently zero joined downstream devices, zero dependent downstream devices, and zero non-dependent downstream devices.

Receiver 14C also obtains MOD from routers 16A and 16B via MO reply packets sent to receiver 14C by routers 16A and 16B in response to MO packets. Receiver 14C saves this MOD to data structure 104. For example, receiver 14C has stored in the fourth row that for <Source 12, group 1>, router 16A has two potential upstream devices, two potential downstream devices, one joined downstream device, one dependent downstream device, and one non-dependent downstream device. As another example, receiver 14C has stored in the last row that for <Source 12, group 1>, router 16B has one potential upstream devices, two potential downstream devices, zero joined downstream devices, zero dependent downstream devices, and two non-dependent downstream devices.

Data structure 104 of FIG. 6 is merely exemplary. Other types of MOD not shown in example data structure 104 may be stored by receiver 14C. As explained above, although illustrated in the form of a table, data structure 104 may be maintained in the form of one or more tables, databases, link lists, radix trees, databases, flat files, or any other data structures.

Figure 7:
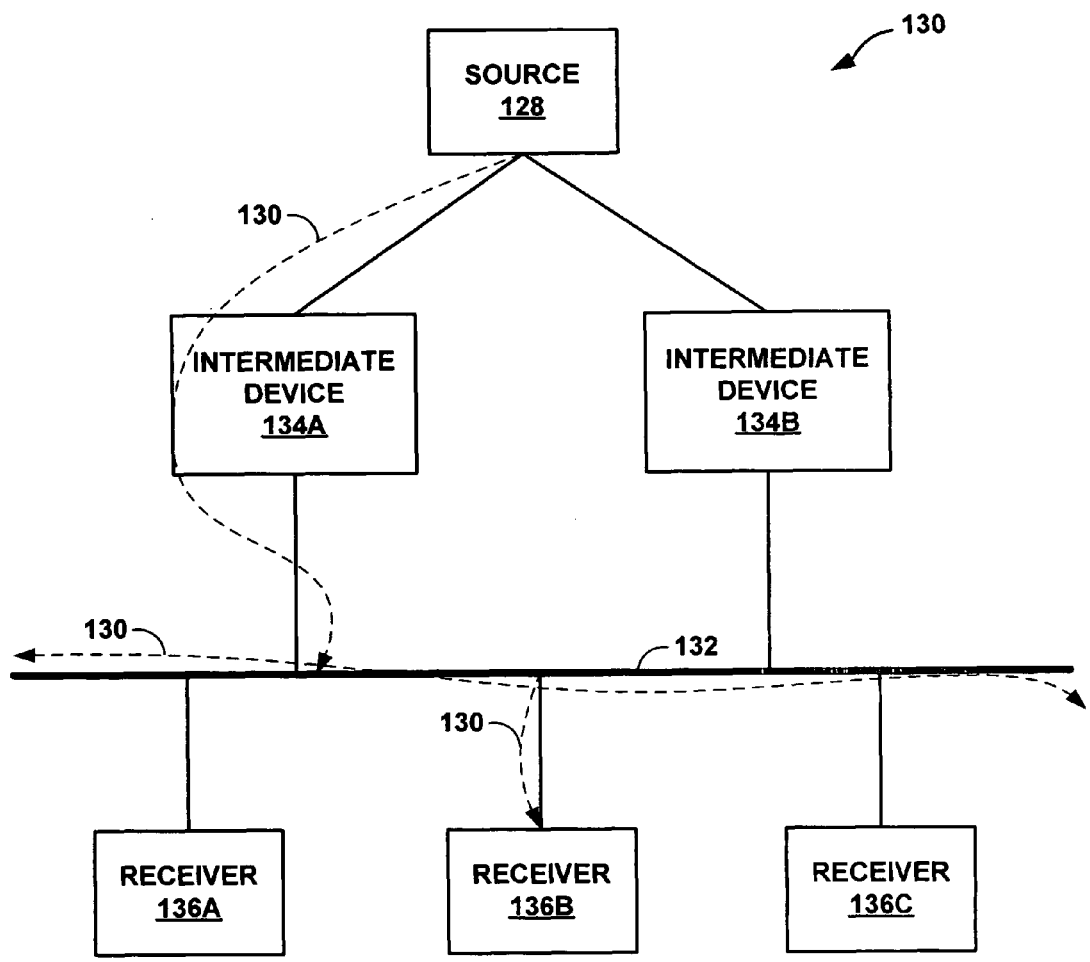
FIG. 7 is a block diagram illustrating a local area network (LAN) environment, in which a source device injects a multicast data stream for a group into a backbone via one or more intermediate devices.

FIG. 7 is a block diagram illustrating a local area network (LAN) environment 126, in which a source device 128 injects a multicast data stream 130 for a group into backbone 132 via one or more of intermediate devices 134A-134B (collectively, intermediate devices 134). Receivers 136A-136C (collectively, receivers 136) may access and share multicast data stream 130 flowing on backbone 132. The principles of the invention described herein may readily be applied to LAN environment 126. For example, receiver 136B may send MOD packets to and receive MOD reply packets from neighboring devices to obtain MOD. Receiver 136B may use the MOD to more intelligently select an upstream router to use for joining the group. For example, in this case receiver 136B may select intermediate device 134A to send a join request to, since source 128 is already sending multicast data stream 130 to intermediate device 134A. In this manner, source 128 need not inject duplicate data streams into LAN environment 126.

Figure 8:
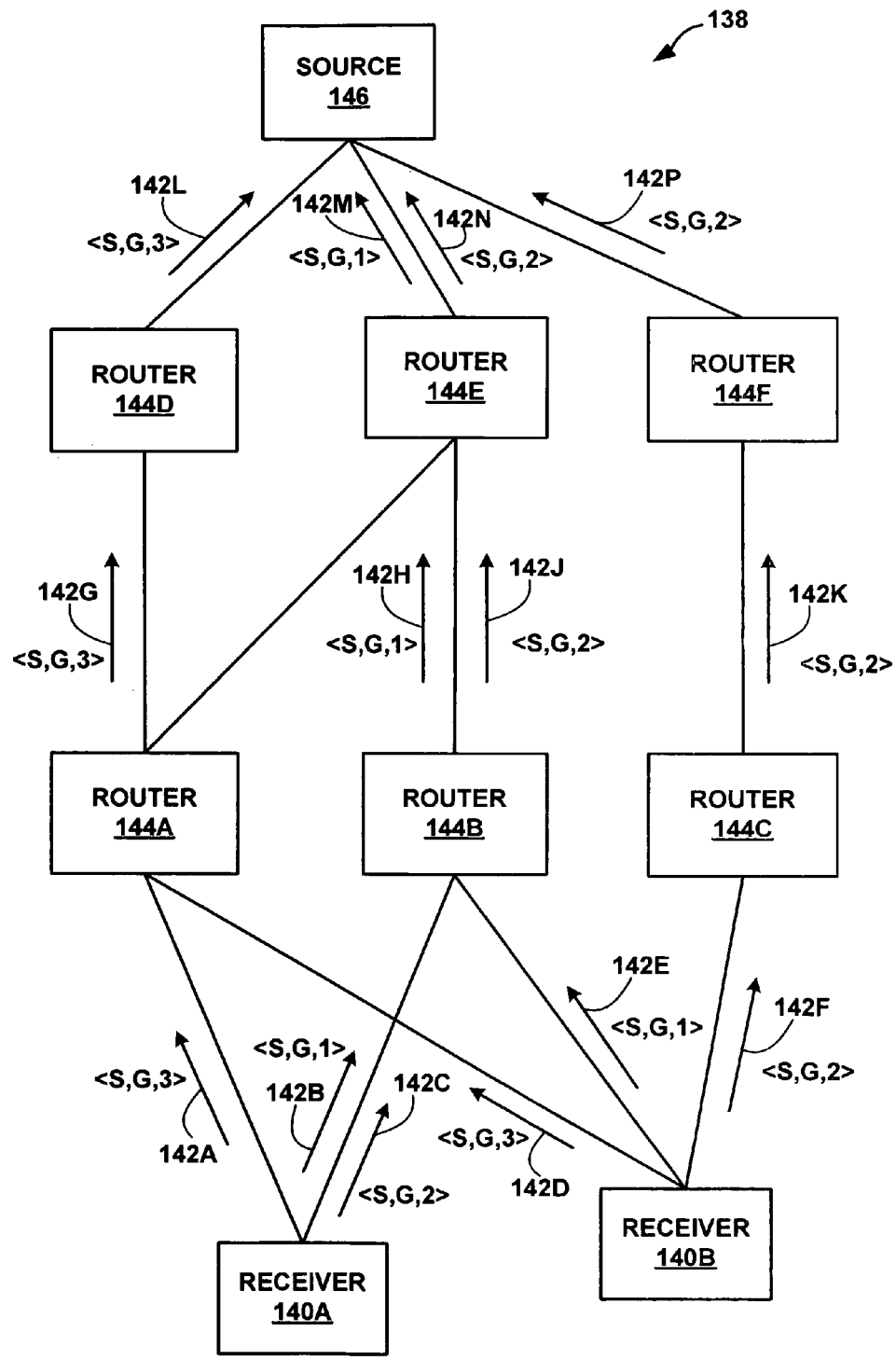
FIG. 8 is a block diagram illustrating another example computing system in which receivers send multicast join requests for multiple instances corresponding to multiple multicast trees for the same multicast group.

FIG. 8 is a block diagram illustrating another example computing system 138 in which receivers 140A-140B (collectively, receivers 140) send multicast join requests 142 for a plurality of "instances" for the same multicast group. As described in further detail below, control information exchanged between the receivers 140 and routers 144 has been extended to incorporate the use of an instance number to allow a single multicast group to potentially set up a plurality of multicast trees, each potentially taking different paths from source device 146 to the receivers 140. Source device 146 may then utilize the different trees when sourcing multicast content for the group, allowing the source device to utilize principles such as equal cost multipath (ECMP) to load balance or otherwise control delivery of the content through the computer network.

More specifically, the different instances correspond to a plurality of multicast trees for a multicast group from a single source device 146. To form the multicast trees, receivers 140 send a plurality of join requests 142 for the same multicast group to a subset of routers 144A-144F along different paths to source device 146. In one embodiment, each device in system 138 is configured with a parameter specifying the number of instances required. The number of the plurality of instances for a given source and multicast group <SOURCE S, GROUP G> may be denoted by N. For example, the devices may be configured by an administrator or a software agent. The number of instances may be the same for all multicast groups in the network, or may be determined independently on a per-group basis. Alternatively, the devices may exchange information to select an optimum N for a given group based on the current topology of system 138 and optionally utilizing multicast optimization data (MOD) described above to cooperatively select N. The devices may run a discovery protocol, e.g., Multicast Virtual Private Network (MVPN) protocol or Multicast Virtual Private Local Area Network Service (MVPLS) protocol, to verify that each device has correctly specified the number of instances. If a device does not know the correct number of instances, this may result in the device receiving duplicate multicast streams or no multicast streams for a multicast group.

In the example of FIG. 8, assume N=3 for <SOURCE DEVICE 146, GROUP 1>. Thus, each receiver 140 will send three join requests 142, one for each instance. Join requests 142 may be extended to include an instance number in the group identifier. Each receiver 140 determines along which paths to send each of the join requests 142. Receivers 140 may attempt to distribute the join requests among the upstream routers to build alternative multicast trees for the different instances. Receivers 140 may also use the multicast optimization techniques described above to intelligently select which upstream router to send the join requests for each instance, for example to send a join request for a particular instance to an upstream router that has already received a join request for that instance.

In this example, receiver 140A initially sends a first join request 142A to router 144A. Join request 142A requests to join the multicast tree for <SOURCE DEVICE 146, GROUP 1, INSTANCE 3> (hereafter <S, G, 3>). Receiver 140A also sends join requests 142B and 142C to router 144B, requesting to join <S, G, 1> and <S, G, 2>, respectively. Receiver 140B sends join request 142D to router 144A requesting to join <S, G, 3>, sends join request 142E to router 144B requesting to join <S, G, 1>, and sends join request 142F to router 144C requesting to join <S, G, 2>. In this manner, the multicast join action has been extended to include an instance number when specifying the particular multicast group and source.

Router 144A receives join requests 142A and 142D for <S, G, 3>. Router 144A determines whether router 144A already has state for <S, G, 3>, i.e., whether router 144A has an entry in multicast forwarding information 98 (FIG. 5) for <S, G, 3>. In other words, router 144A determines whether it has already received a join request for the same source, group and instance (<S, G, 3> in this example). If not, router 144A sends join request 142G to an upstream router to join <S, G, 3>. Otherwise, router 144A does not forward the join request as this would be a redundant join request and may result in receipt of multiple copies of the same multicast content. In this manner, the routers 144 selectively forward the join requests thereby ensuring that no receiving device receives duplicate copies of the same multicast content even though each receiver may be a leaf node to multiple instances associated with the same group.

In the example of FIG. 8, router 144A selects router 144D to which to forward join request 142G. Router 144D in turn likewise determines whether router 144D already has state for <S, G, 3>, and if not, sends a join request 142L to source device 146 for <S, G, 3>. In this manner, receivers 140A and 140B join the multicast tree for instance 3 of the multicast group.

Similarly, router 144B receives join requests 142B and 142E for <S, G, 1>, and 142C for <S, G, 2>. Router 144B determines whether router 144B already has state for <S, G, 1> and <S, G, 2>, and if not, sends join requests 142H and 142J to an upstream router to join <S, G, 1> and <S, G, 2>. Here, router 144B only has one upstream router, so router 144B sends both join requests to router 144E. Router 144E receives the join requests, determines whether router 144E already has state for the instances, and if not, sends join requests 142M and 142N to source device 146 to join <S, G, 1> and <S, G, 2>, respectively. In this manner, receiver 140A joins the multicast tree for instances 1 and 2 of the multicast group, and 140B joins the multicast tree for instance 1 of the multicast group.

Router 144C receives join request 142F to join <S, G, 2>, determines whether router 144C has state for <S, G, 2>, and if not, sends join request 142K to router 144F to join <S, G, 2>. Router 144F receives join request 142K, determines whether router 144F has state for <S, G, 2>, and if not, sends join request 142P to source device 146 to join <S, G, 2>. In this manner, receiver 140B joins the multicast tree for instance 2 of the multicast group. Receivers 140 and routers 144 may similarly issue leave requests that specify the particular instance, to leave an instance of a multicast group.

Figure 9:
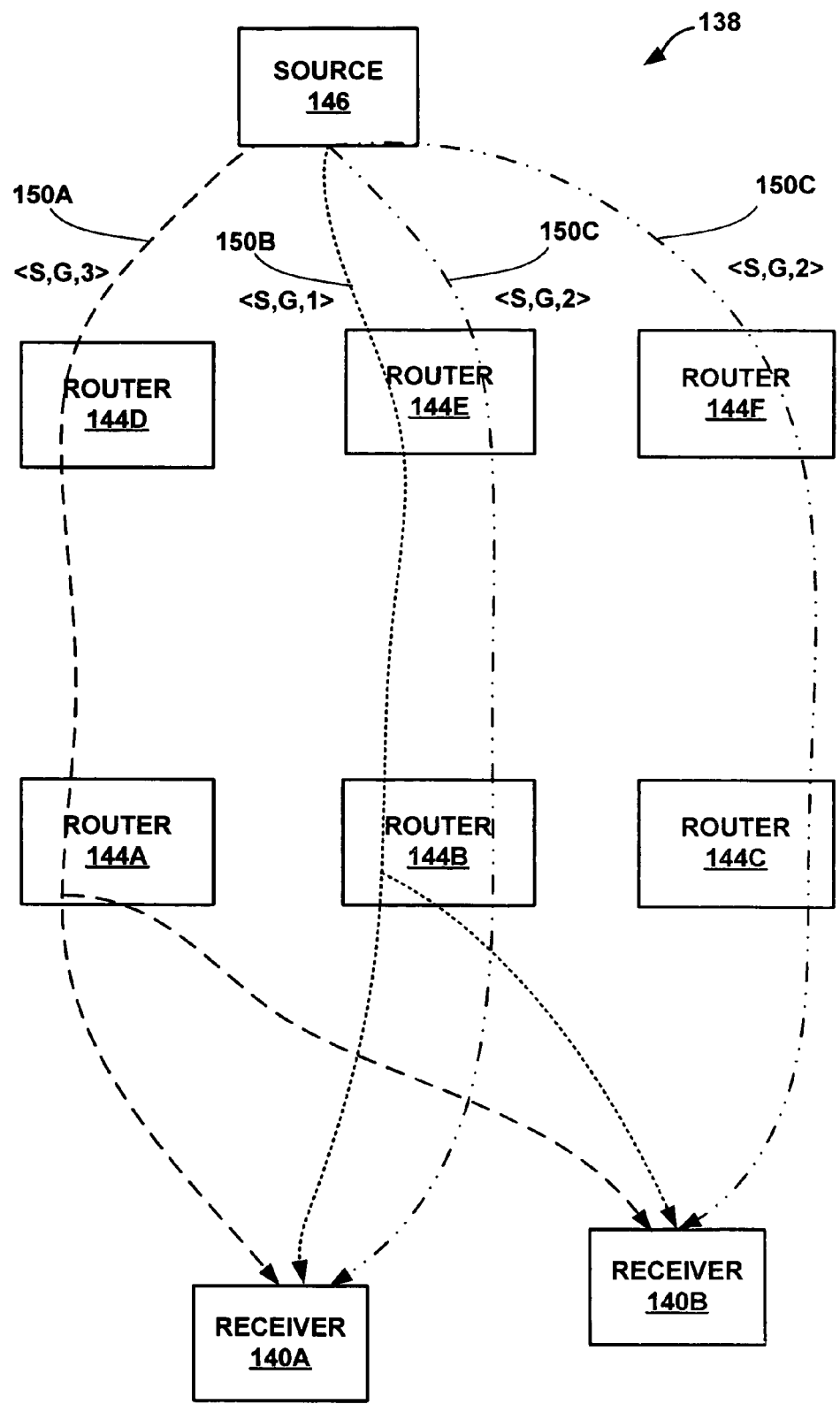
FIG. 9 is a block diagram illustrating the example system of FIG. 8 after a plurality of multicast trees are formed for multiple instances of the same multicast group.

FIG. 9 is a block diagram illustrating the example system 138 of FIG. 8 after a plurality of multicast trees 150A, 150B, and 150C (collectively, multicast trees 150) are formed for instances 3, 1, and 2, respectively, of multicast group <SOURCE DEVICE 146, GROUP 1>.

In practice, when source device 146 receives a multicast flow for multicast group 1, source device 146 selects one of multicast trees 150 for sending the multicast flow. For example, source device 146 may use a flow hash function such as is used by unicast equal cost multipath (ECMP) to select one of instances <S, G, 1>, <S, G, 2>, or <S, G, 3>. As another example, source device 146 may monitor network 138 to determine which multicast tree 150 is experiencing the least congestion, or has the most bandwidth available.

Multicast trees 150 need not be completely separate trees. Multicast trees 150 may partially or even completely overlap. In the example of FIG. 9, a portion of multicast tree 150B overlaps with a portion of multicast tree 150C. It may be desirable to spread out the multicast trees to avoid overlapping where possible, so that the multicast trees traverse different paths.

Typically, source device 146 will use a single multicast tree for sending all of the packets in a multicast flow, so that packets need not be reordered at receivers 140. However, in some embodiments, source device 146 may send packets in a multicast flow using multiple multicast trees 150 in a round-robin fashion, and receivers 140 would reorder the packets upon receipt. In any case, no matter which multicast tree 150 that source device 146 selects for sending the multicast flow, receivers 140 will each receive only a single copy of each multicast packet in the multicast flow.

Assume that source device 146 selects the multicast tree corresponding to instance 1, i.e., multicast tree 150B, to send the multicast content. In this case, source device 146 sends one copy of each packet to router 144E, which forwards the packets to router 144B. Router 144B duplicates the packets, and sends one copy of each packet to receiver 140A, and one copy of each packet to receiver 140B. In this manner, receivers 140 each receive only one copy of each packet in the multicast flow.

If, for example, router 144E were to become inoperative, source device 146 could stop sending the multicast flow for Group 1 via multicast tree 150B, and switch to sending the multicast flow via multicast tree 150A. In this manner, source device 146 may seamlessly switch between pre-established multicast trees to avoid multicasting interruptions and provide improved multicast service to network 138.

Figure 10:
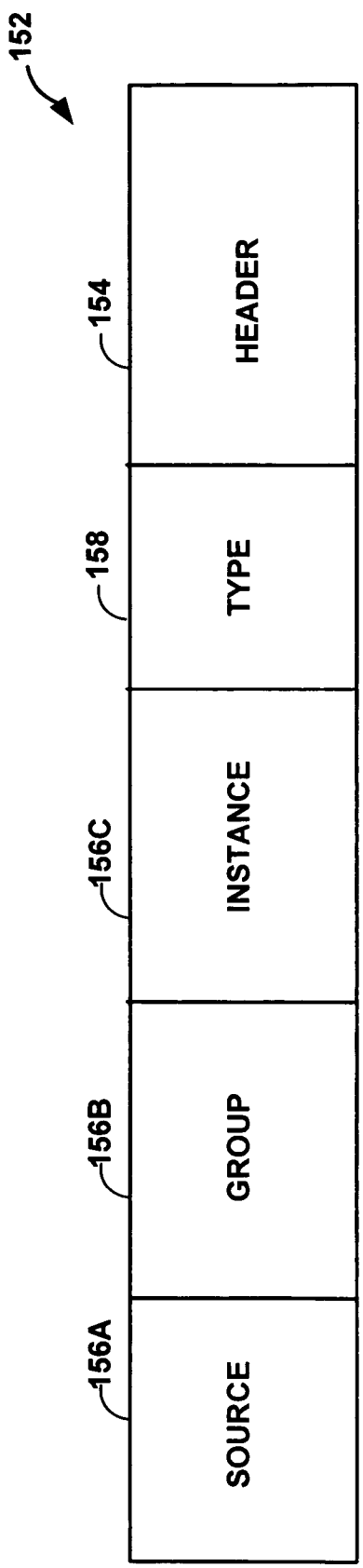
FIG. 10 is a block diagram illustrating an exemplary multicast packet format that has been extended to include an instance number.

FIG. 10 is a block diagram illustrating an exemplary multicast packet format of a packet 152 that has been extended to include an instance number. For example, packet 152 may be an IP packet that encapsulates a join request, a leave request, a Protocol-Independent Multicast (PIM) hello message, or other multicast control message. Packet 152 may be used by an extended multicast protocol, e.g. PIM, point-to-multipoint (P2MP) label distribution protocol (LDP), or a separate protocol designed for multicast optimization. A receiver 140 or an upstream device 144 (FIG. 8) may send a packet 152 for each of N required instances of a multicast group.

In the example of FIG. 10, packet 152 contains a header 154 containing typical packet source and destination information. For example, header 154 may contain IP addresses, ports, checksums, protocol or other information. Packet 152 also contains group identification fields 156A-156C (collectively, group identification fields 156). Source identification field 156A contains an identifier for the source of the multicast traffic. Group identification field 156B contains a group identifier (e.g., a multicast address) that identifies the group. Instance field 156C identifies the instance number. Type field 158 contains a value associated with the particular control message.

Figure 11:
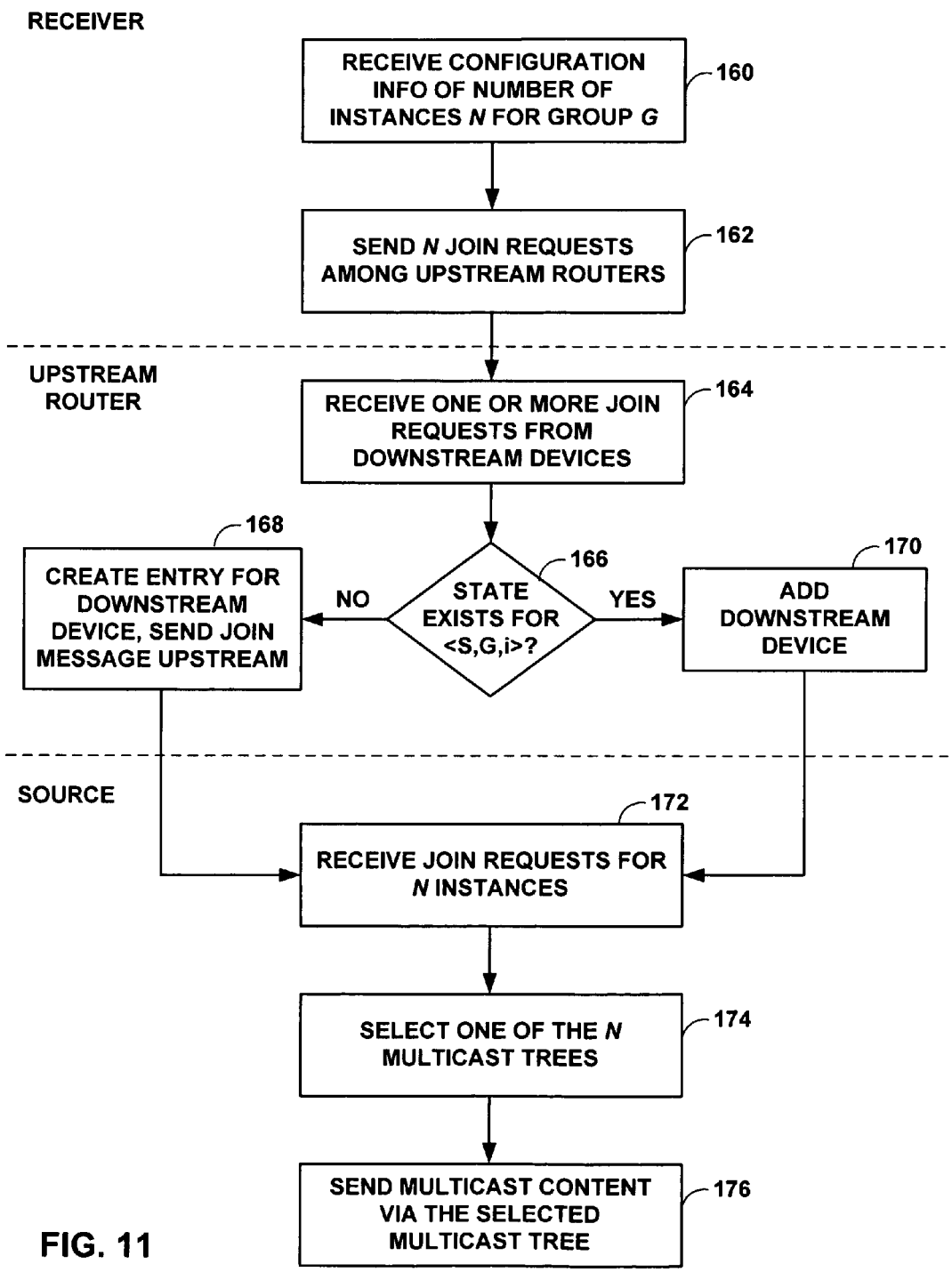
FIG. 11 is a flowchart illustrating example operation of a receiver, upstream router, and source of a system in accordance with the principles of the invention.

FIG. 11 is a flowchart illustrating example operation of an exemplary receiver, upstream router, and source of a system in forming ECMP multicast trees in accordance with the principles of the invention. For exemplary purposes, FIG. 11 will be explained with reference to receiver 140A, router 144A, and source device 146 of FIG. 8.

Receiver 140A receives configuration information informing receiver 140A of the number of instances N for a particular group (160). In this example, receiver 140A is configured with the information that for the multicast group <SOURCE DEVICE 146, GROUP 1>, the number of instances is three. An administrator or a software agent may provide this configuration information to receiver 140A, or receiver 140A may use a discovery protocol to exchange information with neighboring devices to determine an optimal number of instances, possibly using previously exchanged MOD.

When receiver 140A wishes to receive multicast content for <SOURCE DEVICE 146, GROUP 1>, possibly in response to a user request, the receiver 140A sends three join requests to upstream routers, one for each of the three instances for <SOURCE DEVICE 146, GROUP 1> (162). The join requests may be similar to packet 152 of FIG. 10. Where possible, receiver 140A may distribute the join requests among its upstream routers. Receiver 140A may also optionally utilize the multicast optimization techniques described above to share multicast optimization data with neighboring devices. In this manner, receiver 140A may make a more intelligent decision about upstream routers to which to send the join requests. For example, receiver 140A may send multicast optimization (MO) packets that are similar to packet 34 of FIG. 2A, but that contain an additional field specifying the instance number to which the packets relate. Receiver 140A may send such an MO packet for each of the three instances, to all upstream routers, and may receive in response MO reply packets from the upstream routers that are similar to packet 42 of FIG. 2B, but that contain an additional field specifying the instance number to which the packets relate.

Receiver 140A may receive an MO reply packet from router 144A informing receiver 140A that router 144A has one joined downstream device for <SOURCE DEVICE 146, GROUP 1, INSTANCE 3> (i.e., receiver 140B), and may receive an MO reply packet from router 144B informing receiver 140A that router 144B has one joined downstream device for <SOURCE DEVICE 146, GROUP 1, INSTANCE 1> (i.e., receiver 140B). Using this MOD, receiver 140A may decide to send the join request for <S, G, 3> to router 144A, and send the join request for <S, G, 1> to router 144B.

Router 144A receives one or more join requests from its downstream devices (164). Router 144A may determine whether state already exists for the instance specified in the join request, i.e., whether router 144A is already part of the multicast tree for that instance (166). If router 144A does not have state for the instance, router 144A creates an entry in its multicast forwarding information 98 for the instance, and sends a join message to one of the upstream neighbors (168). If router 144A already has state for the instance, router 144A adds the downstream device (e.g., receiver 140A) so that multicast content for that group and instance will be transmitted to receiver 140A (170). Additional upstream routers between router 144A and source device 146 may similarly perform any of steps 164-170.

Source device 146 receives join requests for the various N instances for <SOURCE DEVICE 146, GROUP 1> (172). In this way, multiple multicast trees may be formed between receivers 140 and source device 146. When source device 146 receives multicast traffic for <SOURCE DEVICE 146, GROUP 1>, source device 146 selects one of the multicast trees corresponding to the instances, for example by using a unicast ECMP flow hash function (174), and sends the multicast content via the selected multicast tree (176).

Receivers 140 and routers 144 may be similar to router 80 of FIG. 5. In accordance with the principles of the invention, multicast protocol 102 (e.g., PIM) may be extended to operate on a multicast group instance basis. For example, router 80 may use multicast protocol 102 to send and receive enhanced join and leave requests to join or leave particular instances of a multicast group. Multicast forwarding information 98 and MOD 81 may include entries for each of the plurality of instances for each multicast group to which router 80 belongs.

Various embodiments of the invention have been described. These and other embodiments are within the scope of the following claims.

The invention claimed is:

1. A method of forming multicast distribution structures within a network comprising:
   receiving configuration information at a device indicating a number N of a plurality of instances for a multicast group from a single source device; and
   joining, at the device, the N instances of the multicast group by sending join requests to become a member of the N instances of the multicast group, wherein each of the N instances corresponds to a different multicast distribution structure within the network for the multicast group, wherein two or more of the different multicast distribution structures for the multicast group comprise alternate multicast distribution structures that define different paths from the source device to a given receiver device, and wherein each of the join requests specifies a different one of the N instances of the multicast group to be joined.

2. The method of claim 1, wherein joining comprises sending a join request for each of the N instances from the device to a plurality of upstream devices located between the device and the source device for the multicast group.

3. The method of claim 1, further comprising distributing the join requests among the plurality of upstream devices by sending each of the join requests for the different N instances along different paths towards the source device.

4. The method of claim 1, wherein receiving configuration information comprises using a discovery protocol to distribute the number N of instances.

5. The method of claim 4, wherein the discovery protocol is one of Multicast Virtual Private Network (MVPN) protocol or Multicast Virtual Private Local Area Network Service (MV-PLS) protocol.

6. The method of claim 1, wherein receiving configuration information comprises configuring the number N of instances by an administrator.

7. The method of claim 6, further comprising configuring the plurality of instances N to be the same for all multicast groups in the network.

8. The method of claim 6, further comprising configuring the plurality of instances N independently for each multicast group in the network.

9. The method of claim 1, wherein the device comprises an end-user receiving device or an intermediate device.

10. The method of claim 1, further comprising:
    receiving with the device a respective message from at least two upstream devices located between the device and a source for a multicast group, wherein the message includes multicast optimization data that specifies at least one criterion for selecting an upstream device; and
    selecting at least one and up to N of the at least two upstream devices based on the multicast optimization data,
    wherein sending a join request comprises sending the join requests for each of the N instances from the device to the selected upstream devices to join the N instances for the multicast group.

11. The method of claim 10,
    wherein selecting at least one and up to N of the at least two upstream devices comprises applying one or more criteria to the multicast optimization data of the messages to rank the upstream devices, and
    wherein the criteria for ranking the upstream devices includes one or more of minimization of multicast traffic duplication for the instances of the multicast group within the network, load balancing the multicast traffic within the network, and selecting a network path experiencing shorter communication delays.

12. The method of claim 1, wherein the multicast distribution structures corresponding to the N instances are partially overlapping.

13. The method of claim 1, wherein joining the plurality of instances comprises joining the instances using an extension of one of the Protocol-Independent Multicast (PIM) protocol and the point-to-multipoint (P2MP) label distribution protocol (LOP).

14. A method of using multicast distribution structures within a network comprising:
    receiving, at a source device for a multicast group, join requests for N instances of a multicast group, wherein at least two of the join requests are received on different paths from a single receiver to the source device, wherein each Of the join requests specifies a different one of the N instances of the multicast group to be joined;
    selecting, at the source device, one of the N instances for the multicast group; and
    sending multicast content for the multicast group to the receiver device via a multicast distribution structure corresponding to the selected one of the N instances, wherein the multicast distribution structure is one of two or more alternate multicast distribution structures that define different paths from the source device to the receiver device.

15. The method of claim 14, wherein selecting at the source device for the multicast group one of the N instances comprises using an equal cost multipath (ECMP) flow hash function to select the one of the N instances.

16. The method of claim 14, further comprising specifying at the device the plurality of instances N for the multicast group.

17. The method of claim 16, wherein specifying at the device the plurality of instances N of a multicast distribution structure for the multicast group comprises configuring the plurality of instances N by an administrator.

18. The method of claim 16, wherein specifying at the device the plurality of instances N of a multicast distribution structure for the multicast group comprises using a discovery protocol to distribute the plurality of instances N.

19. A network device comprising:
a control unit for storing configuration data that specifies an instance number N;
a multicast protocol operable on the control unit for generating join requests for N instances of a multicast group, wherein each of the N instances corresponds to a different multicast distribution structure for the multicast group, wherein two or more of the different multicast distribution structures comprise alternate multicast distribution structures that define different paths from the source device to a given receiver device, and wherein each of the join requests specifies a different one of the N instances of the multicast group to be joined; and
an interface to output the join requests to a plurality of upstream devices located between the network device and a source device for the multicast group to join the multicast group.

20. The network device of claim 19, wherein the control unit distributes the join requests among the plurality of upstream devices.

21. The network device of claim 19, wherein an administrator configures the control unit to specify the plurality of instances N for the multicast group.

22. The network device of claim 19, further comprising a discovery protocol executing within the control unit to distribute the plurality of instances N.

23. The network device of claim 19,
wherein the interface receives a respective message from at least two of the plurality of upstream devices, wherein each of the messages includes multicast optimization data that specifies at least one criterion for selecting an upstream device,
wherein the control unit selects one and up to N of the at least two upstream devices based on the multicast optimization data, and generates a join request for each of the N instances, and
wherein the interface outputs the join requests to the selected upstream devices to join the N instances for the multicast group.

24. The network device of claim 23,
wherein the control unit selects at least one and up to N of the at least two upstream devices by applying one or more criteria to the multicast optimization data of the messages to rank the upstream devices, and
wherein the criteria for ranking the upstream devices includes one or more of minimization of multicast traffic duplication for the instances of the multicast group within the network, load balancing the multicast traffic within the network, and selecting a network path experiencing shorter communication delays.

25. The network device of claim 19, wherein the multicast protocol comprises one of the Protocol-Independent Multicast (PIM) protocol and the point-to-multipoint (P2MP) label distribution protocol (LDP).

26. A system comprising:
a source device that provides multicast content for a multicast group; and
a network device coupled to the source device via a plurality of upstream devices located between the network device and the source device,
wherein the network device sends a join request for each of a specified plurality of instances N for a multicast group from the network device to the plurality of upstream devices,
wherein each of the N instances corresponds to a different multicast distribution structure for the multicast group, wherein two or more of the different multicast distribution structures comprise alternate multicast distribution structures that define different paths from the source device to a given receiver device, and wherein each of the join requests specifies a different one of the N instances to be joined, and
wherein the source device selects one of the N instances and sends the multicast content for the multicast group to the network device via the multicast distribution structure corresponding to the selected one of the N instances.

27. The system of claim 26, wherein the network device distributes the join requests among the plurality of upstream devices.

28. A non-transitory computer-readable medium comprising instructions for causing a programmable processor to:
receive configuration information specifying a number N of a plurality of instances for a multicast group from a single source device, wherein each of the N instances corresponds to a different multicast distribution structure for the multicast group, wherein two or more of the different multicast distribution structures comprise alternate multicast distribution structures that define different paths from the source device to a given receiver device; and
send a join request for each of the N instances from the device to a plurality of upstream routers located between the device and the source device for the multicast group to become a member of each of the N instances, wherein each of the join requests specifies a different one of the N instances of the multicast group to be joined.

29. The method claim 1, further comprising creating an entry in forwarding information of the device for each of the N instances of the multicast group.

30. The method of claim 1, wherein each of the join requests includes control information that is extended to include an instance number specifying the instance of the multicast group to be joined.

31. The method of claim 30, wherein the control information comprises a header comprising a group identification field that includes a group identifier, a source identifier, and an instance number.

32. The method of claim 1, wherein the device comprises the given receiver device.

33. The method of claim 1, wherein the device comprises an intermediate device between the source device and the given receiver device.

* * * * *

UNITED STATES PATENT AND TRADEMARK OFFICE
CERTIFICATE OF CORRECTION

| | | Page 1 of 1 |
|---|---|---|
| PATENT NO. | : 7,839,850 B2 | |
| APPLICATION NO. | : 11/445370 | |
| DATED | : November 23, 2010 | |
| INVENTOR(S) | : Kompella | |

It is certified that error appears in the above-identified patent and that said Letters Patent is hereby corrected as shown below:

Column 18, line 34, "(LOP)", should read --(LDP)--

Column 18, line 41, "each Of", should read --each of--

Signed and Sealed this
Third Day of January, 2012

David J. Kappos
*Director of the United States Patent and Trademark Office*